(12) United States Patent
Rand

(10) Patent No.: US 12,417,256 B2
(45) Date of Patent: Sep. 16, 2025

(54) COMPUTER IMPLEMENTED METHOD AND SYSTEM OF MAINTAINING A STATUS OF A STREAM ON A BLOCKCHAIN

(71) Applicant: nChain Licensing AG, Zug (CH)

(72) Inventor: Ricky Charles Rand, London (GB)

(73) Assignee: nChain Licensing AG, Zug (CH)

( * ) Notice: Subject to any disclaimer, the term of this patent is extended or adjusted under 35 U.S.C. 154(b) by 97 days.

(21) Appl. No.: 18/567,716

(22) PCT Filed: May 27, 2022

(86) PCT No.: PCT/EP2022/064475
§ 371 (c)(1),
(2) Date: Dec. 6, 2023

(87) PCT Pub. No.: WO2022/258400
PCT Pub. Date: Dec. 15, 2022

(65) Prior Publication Data
US 2024/0370866 A1 Nov. 7, 2024

(30) Foreign Application Priority Data

Jun. 11, 2021 (GB) ...................... 2108385

(51) Int. Cl.
*G06F 17/40* (2006.01)
*G06F 21/64* (2013.01)
*H04L 9/00* (2022.01)

(52) U.S. Cl.
CPC .............. *G06F 17/40* (2013.01); *G06F 21/64* (2013.01); *H04L 9/50* (2022.05); *H04L 2209/56* (2013.01)

(58) Field of Classification Search
CPC . G06F 17/40; G06F 21/64; H04L 9/50; H04L 2209/56; H04L 63/12; G06Q 20/0655; G06Q 20/405; G06Q 20/145
(Continued)

(56) References Cited

U.S. PATENT DOCUMENTS

| 2020/0005285 A1 | 1/2020 | Jimenez-Delgado et al. |
| 2020/0099528 A1 | 3/2020 | Chan et al. |

(Continued)

FOREIGN PATENT DOCUMENTS

| WO | 2020240290 A1 | 12/2020 |
| WO | 2020240320 A1 | 12/2020 |

(Continued)

OTHER PUBLICATIONS

"How to get all historic changes of a state variable in a smart contract?", retrieved from https://ethereum.stackexchange.com/questions/29024/how-to-get-all-historic-changes-of-a-state-variable-in-a-smart-contract, Feb. 24, 2018, 3 pages (Year: 2018).*

(Continued)

*Primary Examiner* — James D Nigh
(74) *Attorney, Agent, or Firm* — Messner Reeves LLP

(57) ABSTRACT

The present disclosure relates to a computer implemented method of maintaining a status of a stream on a blockchain. The method includes, receiving a create stream message, the create stream message comprising an indication of at least one trigger condition. Then, based on a trigger condition being met, the method includes obtaining data indicative of a state of the stream, and generating an append transaction comprising the data indicative of the state of the stream.

18 Claims, 11 Drawing Sheets

(58) Field of Classification Search
USPC .......................................................... 705/64
See application file for complete search history.

(56) References Cited

U.S. PATENT DOCUMENTS

| | | | | |
|---|---|---|---|---|
| 2021/0081403 | A1* | 3/2021 | Tian | .................... G06F 16/2365 |
| 2023/0082545 | A1* | 3/2023 | Mee | ........................ H04L 67/02 |
| | | | | 705/75 |

FOREIGN PATENT DOCUMENTS

| | | | |
|---|---|---|---|
| WO | 2021165817 | A1 | 8/2021 |
| WO | 2021165848 | A1 | 8/2021 |
| WO | 2021165907 | A1 | 8/2021 |
| WO | 2022049218 | A1 | 3/2022 |
| WO | 2022238154 | A1 | 11/2022 |

OTHER PUBLICATIONS

Chow Events and Logs in Ethereum Smart Contracts: Complete Guide, Jun. 6, 2016, 10 pages (Year: 2016).*
GB2108385.2 Combined Search Report and Abbreviated Examination Report dated Oct. 19, 2021, 6 pages.
PCT/EP2022/064475 International Search Report and Written Opinion dated Sep. 5, 2022, 15 pages.

* cited by examiner

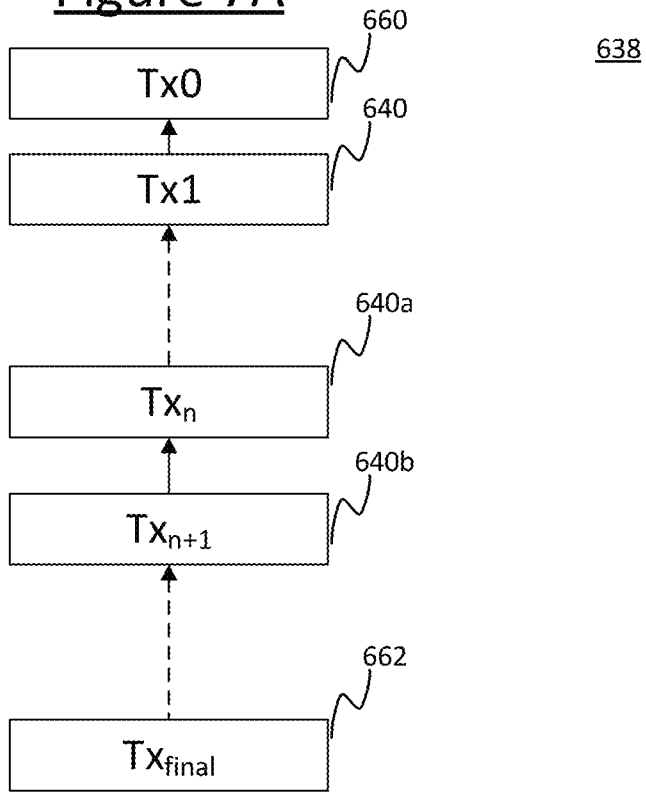

COMPUTER IMPLEMENTED METHOD AND SYSTEM OF MAINTAINING A STATUS OF A STREAM ON A BLOCKCHAIN

CROSS REFERENCE TO RELATED APPLICATIONS

This application is the U.S. National Stage of International Application No. PCT/EP2022/064475 filed on May 27, 2022, which claims the benefit of United Kingdom Patent Application No. 2108385.2, filed on Jun. 11, 2021, the contents of which are incorporated herein by reference in their entireties.

FIELD

The present disclosure relates to methods and systems for implementing a platform of one or more services associated with a distributed ledger, i.e. a blockchain, for one or more clients. More particularity, the present disclosure relates, but is not limited to, the provision of data storage and verification of data storage associated with a blockchain.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks up until one or more coinbase transactions. Coinbase transactions are discussed below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at a node, and the publication of blocks can be achieved through the publication of mere block headers.

The transactions in the blockchain are used to perform one or more of the following: to convey a digital asset (i.e. a number of digital tokens), to order a set of journal entries in a virtualised ledger or registry, to receive and process timestamp entries, and/or to time-order index pointers. A blockchain can also be exploited in order to layer additional functionality on top of the blockchain. Blockchain protocols may allow for storage of additional user data or indexes to data in a transaction. There is no pre-specified limit to the maximum data capacity that can be stored within a single transaction, and therefore increasingly more complex data can be incorporated. For instance, this may be used to store an electronic document in the blockchain, or audio or video data.

Nodes of the blockchain network (which are often referred to as "miners") perform a distributed transaction registration and verification process, which will be described in detail below. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction and may further comprise an unlocking script for unlocking the locking script of the pointed-to output. So, consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

One area of current research is the use of the blockchain for the implementation of "smart contracts". These are computer programs designed to automate the execution of the terms of a machine-readable contract or agreement. Unlike a traditional contract which would be written in natural language, a smart contract is a machine-executable program, which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token, which has no discernible meaning or value. The token thus serves as an identifier that allows the real-world item to be referenced from the blockchain.

The above-mentioned examples or scenarios, whilst making use of the advantages of the blockchain to provide a permanent, tamper-proof record of events; requires a client, client entity, computing devices, or a terminal associated with a client, to include or implement software and/or hardware, or a processor/module, such as a digital wallet for implementing functionality for managing digital assets, managing cryptographic keys for Elliptic Curve Digital Signature Algorithm (ECDSA) that are used, for example, by the BSV (Bitcoin Satoshi's Vision) Blockchain. In addition, there is also a requirement for the client device to be able to implement blockchain transaction construction and have access to BSV libraries. Thus, not only do clients need to include processing to implement such functionality, but they also need to ensure that appropriate security measures are implemented for such processes before they can make use of a blockchain network to send, receive, and view data, and/or digital assets, which relate to a smart contract or a token representing a real world asset transaction.

Accordingly, there is a desire to implement secure, low-complexity, user-friendly, efficient, and robust techniques, that will allow any client, whether computationally sophisticated or not, to be able to instantaneously access and interact with useful applications associated with the blockchain, in a simple, fast, accurate, reliable, and secure manner, that is computationally and functionally less onerous. More particularly, there is a desire to make use of distributed ledger (blockchain) technology, and the advantages of increased security, transparency, and reliability of records, to provide a common platform or interface for a plurality of blockchain related services or applications, that enable any client computing device to ensure any data, event, or digital asset associated with the client, can be instantaneously and securely mined, or written into the blockchain easily, thereby providing a lasting, tamper-proof, and auditable record of it, which can be created, written, updated, read, or viewed as required.

Such an improved solution has now been devised. The present disclosure addresses the above technical concerns by proposing one or more techniques, whereby data, or information associated with a client, may be simply, securely, and instantaneously written into, or obtained from the blockchain, by methods, devices, and systems which provide an application programming interface (API) for one or more services associated with a blockchain, without such clients needing to implement any processing or functionality for using the blockchain, while still being able to avail all advantages associated with the blockchain.

SUMMARY OF THE INVENTION

In a first aspect, the present disclosure proposes methods, devices and systems for maintaining a status of a stream on a blockchain. In more detail, the method of the first aspect comprises the steps of receiving a create stream message, the create stream message comprising an indication of conditions for a trigger, based on a trigger condition being met, conducting the following steps: obtaining data indicative of a state of the stream; and generating an append transaction comprising the data indicative the state of the stream.

In a second aspect, the present disclosure proposes methods, devices, and systems for verifying a blockchain stored representation of a dataset. In more detail, the method of the second aspect comprises the steps obtaining a reference to an on-chain dataset, the on-chain dataset being stored on the blockchain and comprising data carrying transactions, wherein each data carrying transaction comprises data indicative of an event in an off-chain dataset, traversing the on-chain dataset and for each data carrying transaction in the on-chain dataset: determining that the data indicative of an event in the off-chain data set is associated with a data item in the off-chain dataset, and verifying that the on-chain dataset and the off-chain dataset correspond to each other.

In a third aspect, the present disclosure proposes methods, devices, and systems for creating and verifying a blockchain stored representation of a dataset. In more detail, the method of the third aspect comprises generating an on-chain dataset using the method according the first aspect and verifying the on-chain dataset according the second aspect.

Some specific components and embodiments of the disclosed method are now described by way of illustration with reference to the accompanying drawings, in which like reference numerals refer to like features.

BRIEF DESCRIPTION OF THE FIGURES

FIG. 7A is a schematic diagram depicting a chain of transactions.

FIGS. 7B and 7C are schematic diagrams of example transaction.

DETAILED DESCRIPTION

Example System Overview

Figure 1:
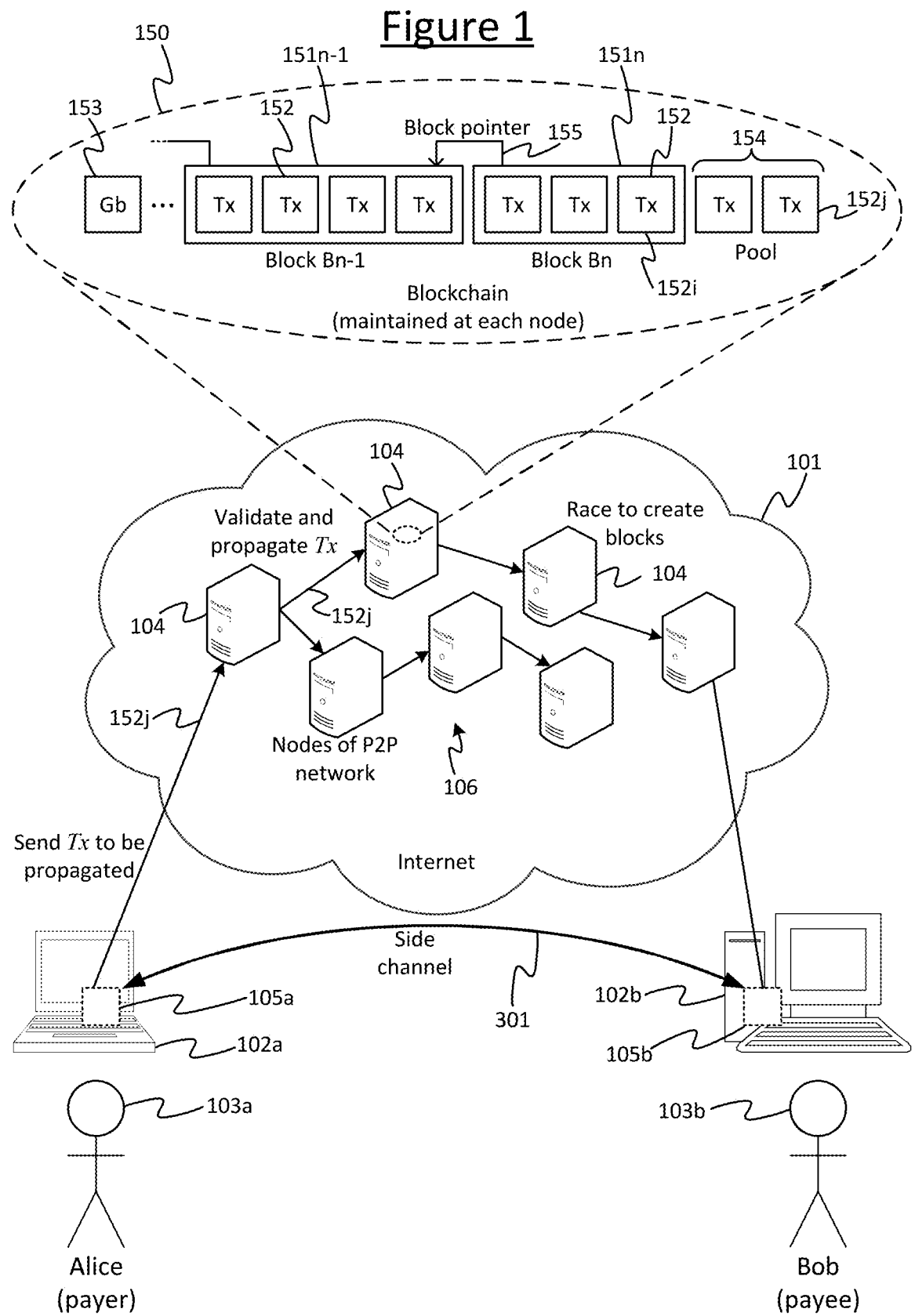
FIG. 1 depicts an example system for implementing a blockchain.

FIG. 1 shows an example system 100 for implementing a blockchain 150. The system 100 may comprise of a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as Application Specific Integrated Circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 160. As mentioned above, maintaining a copy of the blockchain 150 does not necessarily mean storing the blockchain 150 in full. Instead, the blockchain 150 may be pruned of data so long as each blockchain node 150 stores the blockheader (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set 154 of transactions 152 waiting to be incorporated into blocks 151. The ordered set 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the ordered set 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the input authorisation, for example the signature of the user 103a to whom the output of the preceding transaction 152i is locked. In turn, the output of the present transaction 152j can be cryptographically locked to a new user or entity 103b. The present transaction 152j can thus transfer the amount defined in the input of the preceding transaction 152i to the new user or entity 103b as defined in the output of the present transaction 152j. In some cases, a transaction 152 may have multiple outputs to split the input amount between multiple users or entities (one of whom could be the original user or entity 103a in order to give change). In some cases a transaction can also have multiple inputs to gather together the amounts from multiple outputs of one or more preceding transactions and redistribute to one or more outputs of the current transaction.

According to an output-based transaction protocol such as bitcoin, when an entity, such as a user or machine, 103 wishes to enact a new transaction 152j, then the entity sends the new transaction from its computer terminal 102 to a recipient. The entity or the recipient will eventually send this transaction to one or more of the blockchain nodes 104 of the network 106 (which nowadays are typically servers or data centres, but could in principle be other user terminals). It is also not excluded that the entity 103 enacting the new transaction 152j could send the transaction to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152j matches the expected signature, which depends on the previous transaction 152*i* in an ordered sequence of transactions 152. In such an output-based transaction protocol, this may comprise checking that the cryptographic signature or other authorisation of the entity 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned is whether it has yet been validly redeemed by the input of another, onward transaction 152*j* according to the blockchain node protocol. Another condition for a transaction to be valid is that the output of the preceding transaction 152*i* which it attempts to assign or redeem has not already been assigned/redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered set 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered set of transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. A significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the ordered set of yet to be published transactions 154 at any given time, depending on when they started searching for a solution or the order in which the transactions were received. Whoever solves their respective puzzle first defines which transactions 152 are included in the next new block 151*n* and in which order, and the current set 154 of unpublished transactions is updated. The blockchain nodes 104 then continue to race to create a block from the newly defined outstanding ordered set of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to assign an accepted amount of the digital asset in a new special kind of transaction which distributes a defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network but do not participate in validating, constructing or propagating transactions and blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol or be defined by a combination of the script and the node protocol.

On condition that the newly received transaction 152j passes the test for being deemed valid (i.e. on condition that it is "validated"), any blockchain node 104 that receives the transaction 152j will add the new validated transaction 152 to the ordered set of transactions 154 maintained at that blockchain node 104. Further, any blockchain node 104 that receives the transaction 152j will propagate the validated transaction 152 onward to one or more other blockchain nodes 104 in the network 106. Since each blockchain node 104 applies the same protocol, then assuming the transaction 152j is valid, this means it will soon be propagated throughout the whole network 106.

Once admitted to the ordered set of transactions 154 maintained at a given blockchain node 104, that blockchain node 104 will start competing to solve the proof-of-work puzzle on the latest version of their respective ordered set of transactions 154 including the new transaction 152 (recall that other blockchain nodes 104 may be trying to solve the puzzle based on a different ordered set of transactions 154, but whoever gets there first will define the ordered set of transactions that are included in the latest block 151. Eventually a blockchain node 104 will solve the puzzle for a part of the ordered set 154 which includes Alice's transaction 152j). Once the proof-of-work has been done for the ordered set 154 including the new transaction 152j, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
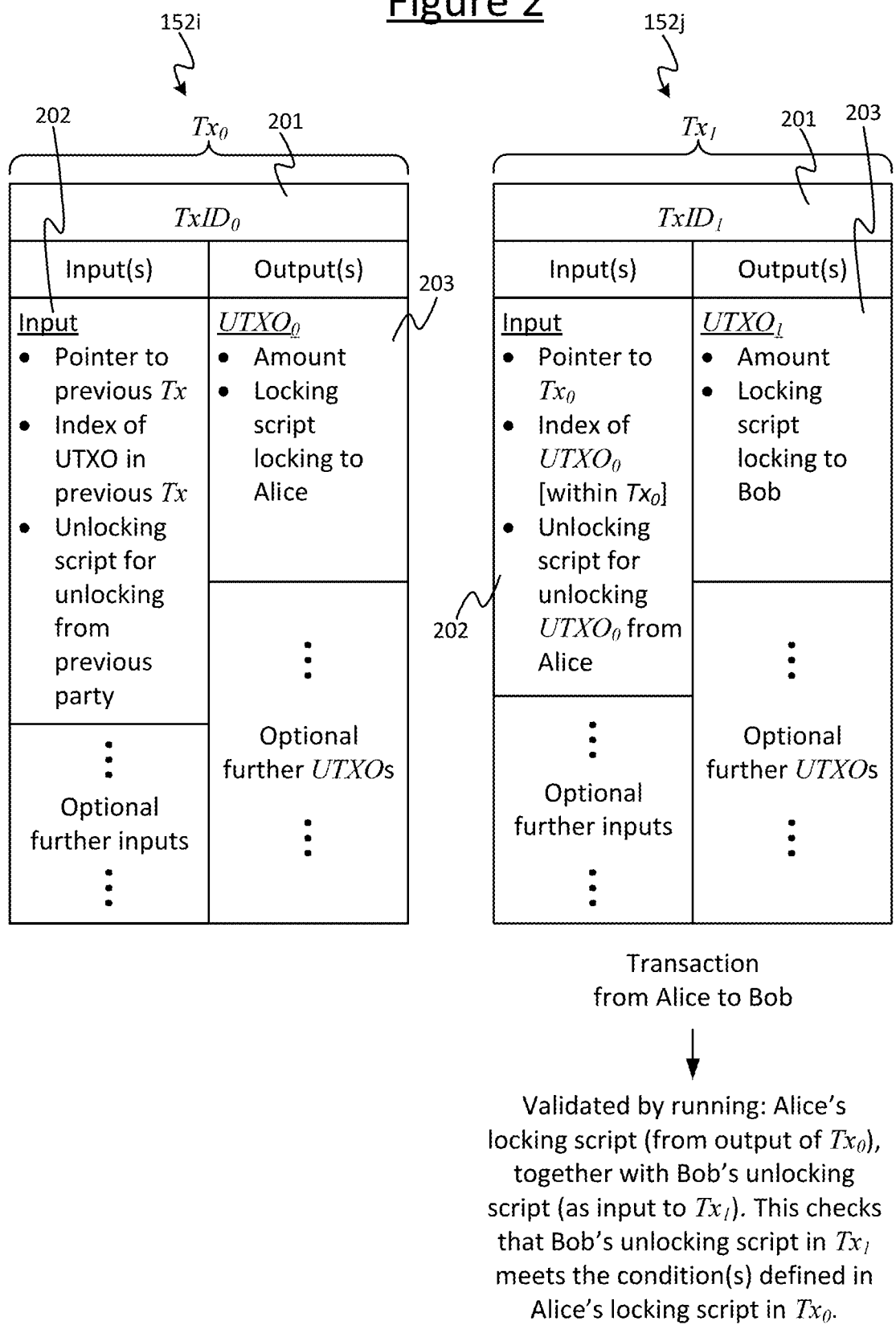
FIG. 2 illustrates an example transaction protocol.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the locking script (in this example a stack-based language).

Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered set of transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node that publishes her transaction 104. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that publishes the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_ . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

As shown in FIG. 1, the client application on each of Alice and Bob's computer equipment 102a, 120b, respectively, may comprise additional communication functionality. This additional functionality enables Alice 103a to establish a separate side channel 301 with Bob 103b (at the instigation of either party or a third party). The side channel 301 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 301 may be used to exchange any other transaction related data, such as keys, negotiated amounts or terms, data content, etc.

The side channel 301 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 301 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Client Software

Figure 3A:
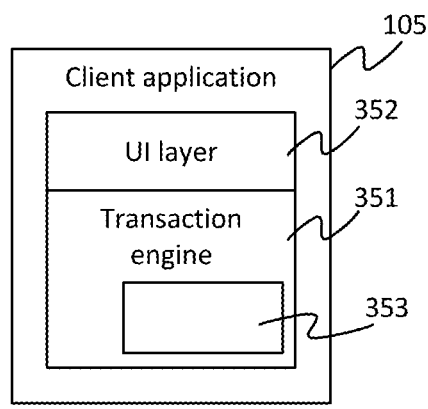
FIGS. 3A and 3B illustrate an example implementation of the client application and its user interface.

FIG. 3A illustrates an example implementation of the client application 105 for implementing embodiments of the presently disclosed scheme. The client application 105 comprises a transaction engine 351 and a user interface (UI) layer 352. The transaction engine 351 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly. In accordance with embodiments disclosed herein, the transaction engine 351 of each client 105 comprises a function 353 . . . .

The UI layer 352 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 351 may be implemented in a separate application than the UI layer 352, or the functionality of a given module such as the transaction engine 351 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
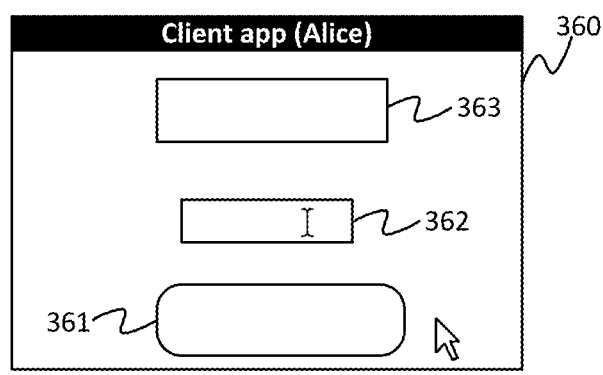

FIG. 3B gives a mock-up of an example of the user interface (UI) 360 which may be rendered by the UI layer 352 of the client application 105a on Alice's equipment 102a. It will be appreciated that a similar UI may be rendered by the client 105b on Bob's equipment 102b, or that of any other party.

By way of illustration FIG. 3B shows the UI 360 from Alice's perspective. The UI 360 may comprise one or more UI elements 362, 362, 363 rendered as distinct UI elements via the user output means.

For example, the UI elements may comprise one or more user-selectable elements 362 which may be, such as different on-screen buttons, or different options in a menu, or such like. The user input means is arranged to enable the user 103 (in this case Alice 103a) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands).

Alternatively or additionally, the UI elements may comprise one or more data entry fields 362, through which the user can . . . . These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 363 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 360 shown in FIG. 3 is only a schematized mock-up and in practice it may comprise one or more further UI elements, which for conciseness are not illustrated.

Node Software

Figure 4:
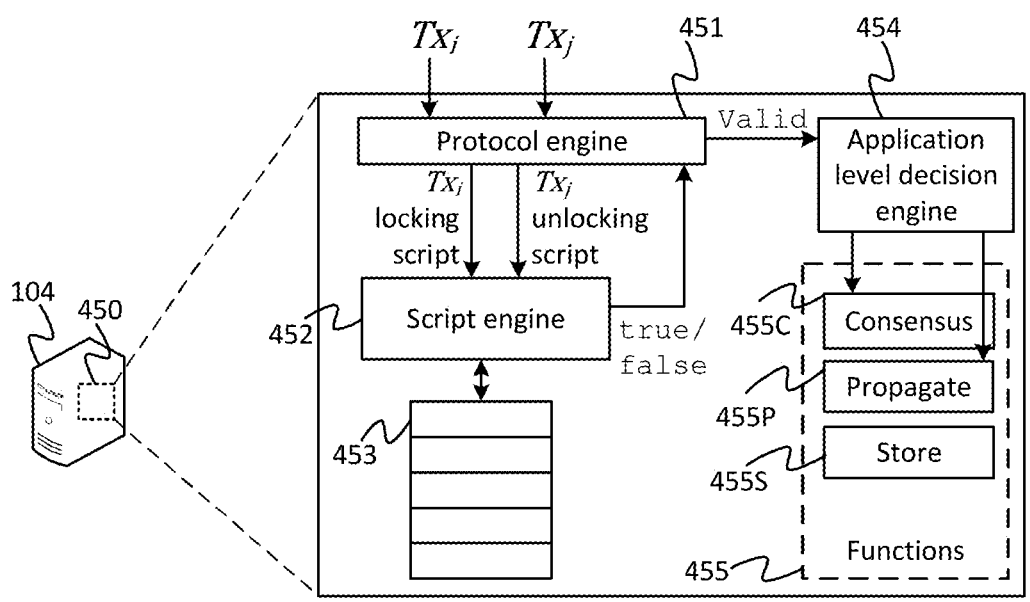
FIG. 4 illustrates an example of the node software that is run on each blockchain node of the network.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 351 is typically configured to recognize the different fields of a transaction 152 and process them in accordance with the node protocol. When a transaction 152$j$ (Tx$_j$) is received having an input pointing to an output (e.g. UTXO) of another, preceding transaction 152$i$ (Tx$_{m-1}$), then the protocol engine 451 identifies the unlocking script in Tx; and passes it to the script engine 452. The protocol engine 451 also identifies and retrieves Tx$_i$ based on the pointer in the input of Tx$_j$. Tx$_i$ may be published on the blockchain 150, in which case the protocol engine may retrieve Tx$_i$ from a copy of a block 151 of the blockchain 150 stored at the node 104. Alternatively, Tx$_i$ may yet to have been published on the blockchain 150. In that case, the protocol engine 451 may retrieve Tx$_i$ from the ordered set 154 of unpublished transactions maintained by the node 104. Either way, the script engine 451 identifies the locking script in the referenced output of Tx$_i$ and passes this to the script engine 452.

The script engine 452 thus has the locking script of Tx$_i$ and the unlocking script from the corresponding input of Tx$_j$. For example, transactions labelled Tx$_0$ and Tx$_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of Tx$_j$ does not exceed the total amount pointed to by its inputs, and that the pointed-to output of Tx$_i$ has not already been spent by another valid transaction. The protocol engine 451 evaluates the result from the script engine 452 together with the one or more protocol-level conditions, and only if they are all true does it validate the transaction Tx$_j$. The protocol engine 451 outputs an indication of whether the transaction is valid to the application-level decision engine 454. Only on condition that Tx$_j$ is indeed validated, the decision engine 454 may select to control both of the consensus module 455C and the propagation module 455P to perform their respective blockchain-related function in respect of Tx$_j$. This comprises the consensus module 455C adding Tx$_j$ to the node's respective ordered set of transactions 154 for incorporating in a block 151, and the propagation module 455P forwarding Tx$_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In non-preferred embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

Event Stream Blockchain Storage

A first aspect of the present disclosure relates generally to the provision of blockchain storage of event streams as a part of a platform that provides a plurality of services that are associated with a blockchain. The platform conducting a method and being provided for a plurality of clients and implemented by at least one platform processor being associated with an application programming interface (API).

The method comprises the steps of receiving a create stream message, the create stream message comprising an indication of conditions for a trigger, based on a trigger condition being met, conducting the following steps: obtaining data indicative of a state of the stream, and generating an append transaction comprising the data indicative the state of the stream.

The method preferably comprises the following step being conducted after generating the append transaction: arranging for the append transaction to be broadcast to the blockchain.

Advantageously, by providing a trigger for generation (and subsequent submission) of a transaction that represents a current stream state, greater flexibility and selectability in how up to date the blockchain representation of the stream needs to be, is achieved. A client, upon creation of the event stream, can select aspects of the trigger depending on their requirements.

In some embodiments, the method further comprises the step of monitoring re-occurrence of the trigger condition.

For longer standing event streams, a trigger condition may occur multiple times. By monitoring for when additional trigger conditions are met, the on-chain dataset is updated when needed.

In some embodiments, the method further comprises the step of generating (and optionally broadcasting) an initial transaction comprising at least data based on the indication of conditions for the trigger. In some embodiments, the data based on the indication of conditions for a trigger are stored on the output of the initial transaction. In some embodiments, the append transaction comprises an input that spends an output of the initial transaction or a previous append transaction. Preferably the data based on the indication of conditions for the trigger is the indication of conditions for the trigger.

Advantageously, by spending the output of the initial transaction or a preceding append transaction in the append transaction, the order in which each event occurs is preserved on the blockchain. A transaction cannot be included on the blockchain if it comes from a transaction that isn't already part of a block or at least the same block. Order preservation is advantageous in that if a party is interested in knowing the current state of an event stream, they need only traverse the spending chain till the end. Computing resources can be saved as no further checks are required to determine whether the transaction with unspent outputs is the last transaction.

A further advantage of such a spending relationship is traversability of the on-chain dataset as is discussed below under the heading "Traversing an On-Chain Dataset".

In some embodiments, the data indicative of the state of the stream is stored on an output of the append transaction. Preferably the OP_RETURN opcode is used. More preferably the data is stored after the OP_RETURN opcode.

Advantageously, repurposing existing features (such as the abovementioned use of an output of a transaction and the use of the OP_RETURN opcode) of blockchain transactions means that miners or other blockchain processing devices associated with the blockchain do not need any technical capabilities beyond what they are already equipped with.

In some embodiments, the trigger condition is based on any one or more of the following: reception of a message indicating the stream is finalised, an elapsed time, a comparison of an elapsed time and a threshold time, and/or a comparison of a number of events received and a threshold number of events.

Advantageously, different trigger systems are provided for different client needs and can be selected by the client.

In some embodiments, the elapsed time is based on the time since a preceding trigger condition was met and/or the time since the create message was received. In some embodiments, the create message further comprises the threshold time.

Decoupling the submission of transactions to the blockchain from updates to the event stream preferably using the abovementioned feature provides a number of advantages including:
- hiding the exact number of events that have occurred. For example, if it were known a stream was updated on-chain every 50 events, then a third party need only count every on-chain append transaction, multiply the count by 50 and have an approximate view of the total number of events. Depending on the smart contract associated, this may leak confidential information to third parties; and
- preventing any loops occurring where, if your event stream is tracking its own on-chain submissions, then any event submitted to the event stream would trigger another event to be created and therefore another event transaction, and so on and so forth.

In some embodiments, the number of events received is based on the number of events received since a preceding trigger condition was met and/or a number of events received since the create message was received. In some embodiments, the create message comprises the threshold number of events. In some embodiments, the threshold number of events is 1. In some embodiments, the threshold number of events is greater than 1.

In some embodiments, the trigger condition is based only on the comparison of the elapsed time and the threshold time. In some embodiments, the trigger condition is based only on the comparison of the number of events received and the threshold number of events.

In some embodiments, the state of the stream comprises a hash of a preimage of a latest event of the stream. In some embodiments, the state of the stream comprises the preimage of the latest event of the stream. In some embodiments, the state of the stream comprises data indicative of a data of the latest event of the stream. In some embodiments, the data indicative of the data of the latest event of the stream comprises a hash of the data of the latest event of the stream. In some embodiments, the data indicative of a data of the latest event of the stream is the data of the latest event of the stream. Preferably, the preimage comprises metadata of the latest event of the stream.

Advantages of these technical features are provided throughout but in particular under the heading "Current State of the Stream".

In some embodiments, the create stream message comprises an indication of the format of the data indicative of the state of the stream.

Advantageously, by providing an indication of the format of the stream state data as it is recorded each time the blockchain on the blockchain itself, a third party wishing to validate, audit, or read the data as it is stored on the blockchain need only find the initial transaction to properly read the remainder of the on-chain dataset. No further decoding information or communication with other parties, datastores, or devices is necessary beyond what is present on the blockchain.

In some embodiments, the method further comprises the step of updating an off-chain database with metadata of the append transaction. In some embodiments, the metadata is used to identify the transaction on the blockchain, to verify the presence of the transaction in a block on the blockchain, or to construct a proof of inclusion of the transaction into the blockchain.

Preferably, the metadata comprises any one or more of the following: a transaction id of the append transaction, a subset of the input(s) to the append transaction, a block header of a block the append transaction is included in, a block id of the block the append transaction included in, a timestamp associated with the append transaction, and an array of sibling hashes for the transaction id of the append transaction. More preferably the metadata comprises the transaction id of the append transaction, the block header of the block the append transaction is included in, and an array of sibling hashes for the transaction id.

In some embodiments, the method further comprises the steps of receiving a request to add an event to the stream, the request comprising event data and an override flag, generating a further append transaction comprising data indicative the event data, and arranging for the append transaction to be broadcast to the blockchain.

Advantageously, storing a proof of existence in a blockchain increases security and provides easier means to auditors to verify that data is present when it should be in an on-chain dataset.

Also according to first aspect, a device comprising a processor and memory, the memory including executable instructions that, as a result of execution by the processor, causes the device to perform the above described computer-implemented method.

Also according to the first aspect, a system comprising a platform processor according to the above device described above, and a client device configured to submit event data to the platform processor.

Advantageously, such a method, device, and system as described above in the first aspect allows for clients to select how much, how frequently, and what information they wish to store on the blockchain. Benefits and advantages of each different method and data types of storage are explained below.

Figure 5:
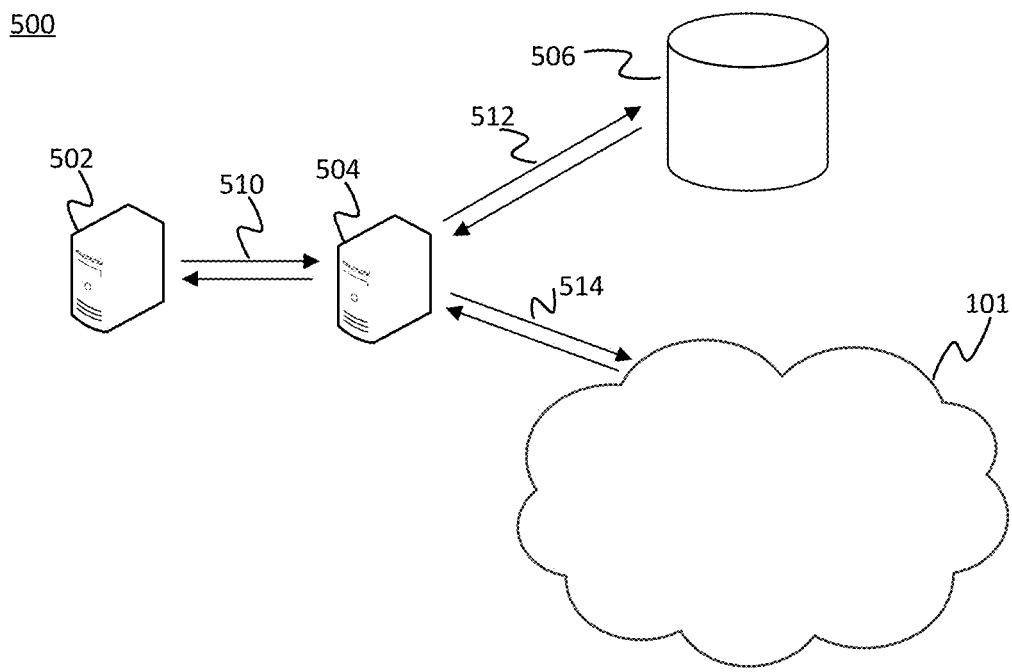
FIG. 5 is a schematic diagram illustrating the submission of event data to a platform processor, database, and blockchain network.

FIG. 5 relates to a system 500 according to a first aspect of the present disclosure for enabling event data to be stored in a database and data indicative of the event data to be stored on the blockchain. Optionally, the representation is the event data itself, a digest of the event data and/or a reference to the event data. The event data in the present embodiment relates to an event stream.

An event stream provides a log of the exact sequence of events executed in order and is implemented at least partially on the blockchain. In some embodiments, the event stream is implemented using the blockchain and/or in an off-chain database. The event stream may represent or track a Finite State Machine (FSM), such as a Deterministic Finite Automaton (DFA), which is a well-known computing term, representing a system having a finite number of states, and which may be in only one state at a given time, with a transition function or a trigger event for transitioning from one stage to the next. In some embodiments such event stream is useful to represent a control means or technique for a technical process.

The disclosure relevant to the present aspects provides a smart contract, which may be an FSM, as a usage of said event streams. As discussed immediately below, this is provided as an example and others would be apparent to a person skilled in the art.

The event stream represents the machine-readable contract or smart contract on the blockchain, where, advantageously, an immutable record of the past and current inputs of the smart contract is written into the blockchain. When these inputs are replayed, it results in a deterministic state of the smart contract. Thus, an event stream is associated with a smart contract and/or vice versa. The event stream may also be associated with an in-order data logger, a tracker for an off-chain, real world, process that has a fixed set of states, or a sequence of inputs provided to a real world off-chain process optionally with the results of said inputs. A person skilled in the art will appreciate that other systems beyond smart contracts may also use an immutable FSM or DFA advantageously.

The system 500 comprises a client 502 configured to interact with a platform processor 504 associated with an API for the service. The platform processor 504 is described herein as a monolithic server for ease of illustrative purposes. A person skilled in the art will appreciate that it may be implemented as a single server, a mainframe, a collection of servers, a microservice, a collection of microservices, cloud service, any combination of the preceding and/or other computing platform or platforms.

The client 502 communicates 510 with the platform processor 504 via the platform processor's API. In the present example of this aspect, the client 502 is configured to at least create, update, and finalise an event stream. UK Patent Application No. 2013929.1 filed on 4 Sep. 2020 by nChain Holdings Ltd provides an illustrative example of platform processor that may be used to manage smart contracts and/or any other application using event streams.

The platform processor 504 is associated with a snapshot instance database 506 that is configured to store, update, provide, and/or indicate the present state of a smart contract, as recorded in the respective event stream at any given time. There will only be one event stream per smart contract that is associated with a given client among a plurality of clients. In some embodiments, each client among a plurality may be associated with an account or identifier which may be used to identify a particular smart contract that is associated with the respective client. The platform processor 504 is configured to communicate 512 with the database 506 such that it can at least store, access, and update the records event data associated with each event stream.

The platform processor 504 is configured to store a representation of the event stream onto a blockchain. Thus, the platform processor 504 is configured to communicate 514 with a blockchain network 101. The blockchain network 101, an example of which is described above with reference to FIG. 1, stores the relevant event data (or data representative of said event data) on transactions in the blockchain. Example transactions are described above with reference to FIG. 2.

The platform processor 504 is configured to both submit data to the blockchain network 101 and read data from the blockchain network 101. Optionally, the platform processor 504 maintains its own copy (optionally pruned) of the blockchain so that it does not need to query a network node for blockchain data.

Figure 6A:
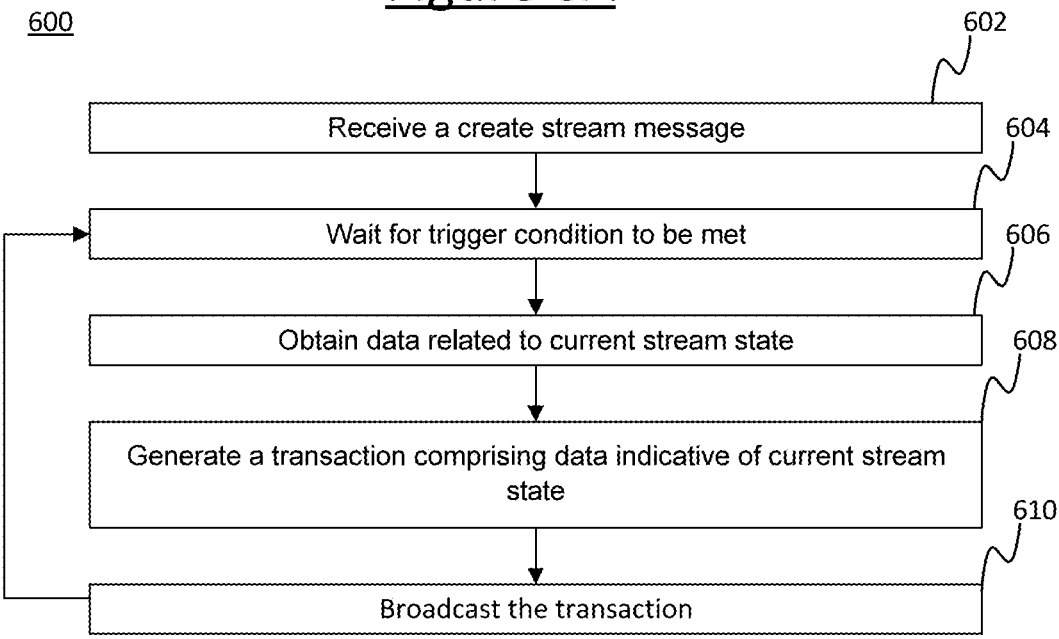
FIG. 6A is a flowchart depicting a method for submitting the current state of an event stream to a blockchain.

Referring to FIG. 6A, a method 600 of maintaining a representation of an off-chain dataset in an on-chain dataset is shown. The dataset is a set of events and the source of each of the events is from the client that creates it and/or any party with authority delegated by the client.

The dataset used as an example with reference to this aspect and FIG. 6A is preferably stored in its entirety in an off-chain database or other datastore means. In a preferred embodiment, data indicative of a subset of the events stored on the blockchain. Each transaction stored on the blockchain preferably represents a state of the stream and more preferably the state of the stream refers to the latest event.

This method is preferably run by the platform processor 504 and is run every time a client is wanting to create a new event stream. Preferably, the method operates for as long as the event stream is active. The client 502 optionally provides an indication to the platform processor 504 as to when to finalise and close the event stream.

Firstly, the event stream is created 602 upon reception of a message to do so. This message optionally comes in the form of an API request and originates from the client 502. The create message comprises indications of the conditions of when data should be stored on the blockchain and what format of data should be stored. These conditions are triggered at certain points and as such can also be thought of as "conditions for a trigger" or "trigger conditions".

Optionally, an initial transaction is created and submitted to the blockchain at this point. The initial transaction 660 is preferably of the form as described with reference to FIG. 7C. The conditions for the trigger and the type of data to be stored are stored on the initial transaction.

With the stream created or the stream create message received, transactions are added to the blockchain when 604 the trigger condition is met. Optionally, the method waits until the trigger condition is met. "Waiting" in this context preferably relates to an interrupt system such that the process does not need to actively search for the condition to be met. Alternatively, or additionally, waiting relates to the use of polling to the see if the condition has been met.

With the trigger met, a current state of the event stream is obtained 606. The format and contents of the current state of the stream and/or data indicative of the current state of the stream is described in further detail below under the heading "Current State of the Stream".

An append transaction is generated 608 and comprises data indicative of the current stream state. The append transaction is preferably of the form as described with reference to FIG. 7B and the data indicative of the current state of the stream is stored in the payload output of the append transaction. The append transaction further comprises an input that spends an output of the previous transaction submitted to the blockchain that is related to the present event stream as discussed with reference to FIGS. 7A and 7B. As such, the generation step further comprises obtaining a reference to the latest transaction in the chain of transactions and the reference is preferably the dust outpoint of the preceding transaction.

The append transaction is arranged to be broadcast 610 to the blockchain network 101 for addition to the blockchain. This arrangement of broadcast of the append transaction preferably comprises sending the append transaction to a further thread, process, or device that is configured to submit data to blockchain nodes for inclusion into the blockchain.

The sending is preferably conducted using a message bus as described with reference to FIG. 6B.

The generate and append steps are optionally conducted asynchronously in a separate thread, process, or device. By way of example, this is conducted using the message bus as described with reference to FIG. 6B.

The method loops back and waits for the trigger condition to be met again. Optionally, the method additionally waits for a finalise message to be received and/or a finalise condition to be met. The finalise conditions optionally are included in the create message similar to the trigger conditions.

Figure 6B:
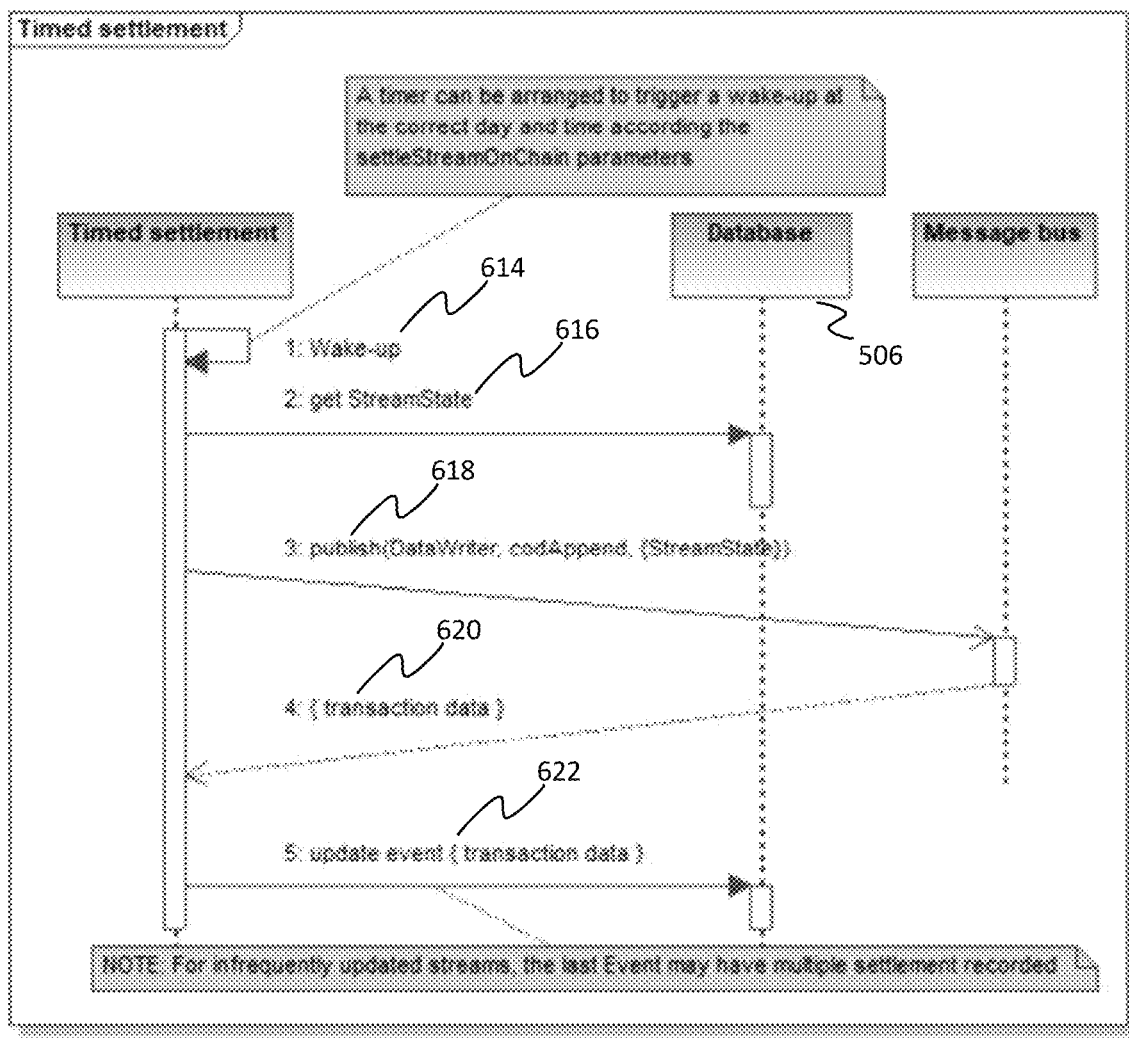
FIG. 6B is a sequence diagram depicting data and/or process flow associated with a timer condition being met.

FIG. 6B relates to an example process 612 of the present aspect. In this example embodiment, a trigger condition based on a timer is used. The example process 612 shown may be executed or performed by the platform processor 504.

Prior to the process as depicted, a timer is established such that, when the timer activates, the process is woken up at step 614. Then, the current stream state is obtained 616. This is obtained from a database 506. Optionally, the current stream state is processed.

The current stream state is published 618 to the blockchain via a message bus. With the publish message on the message bus, a further service or process takes the stream state data and submits to the blockchain.

Optionally, once the transaction comprising the stream state has been included in a block and/or confirmed on the blockchain (where confirmation usually means 6 blocks have been added after the inclusion of said transaction), metadata of the transaction and/or the transaction itself is obtained 620. The metadata of the transaction is described in greater detail below under the heading "Updating Off-Chain Dataset with On-Chain Metadata".

The metadata of the transaction is stored 622 in the database. Optionally, where the stream state is a latest event of the event stream, the event database entry is updated with transaction metadata and/or the event database entry is tagged that it has been submitted and/or confirmed on the blockchain.

If the latest event has already been submitted to the blockchain when the trigger condition is met again, the same latest event is submitted to the blockchain again.

Alternatively, the presence of the tag and/or transaction data in the database is used so that if a trigger condition is met and no new event data is present and the current latest event tagged that it is already on the blockchain, no new transaction is created and the process will wait for a further trigger.

Chain of Dust

Referring to FIG. 7A, an example chain of transactions 638 (also known as a "chain of dust") is shown. The chain of transactions comprises a number of transactions 660, 640, 640a, 640b, 662 that are related to each other. The first transaction 660 is an initial transaction and comprises metadata about the chain. The chain also comprises a number of append transactions 640, 640a, 640b and preferably they comprise data indicative of event data stored in an off-chain database. The append transactions 640, 640a, 640b and final transaction 662 also comprise an input associated with an output from the transaction preceding them, thus establishing a spending relationship (signified as arrows in FIG. 7A). The input is of the form of an outpoint, where an outpoint is a transaction id and index of the output. This input spends the transaction output from the previous transaction. By way of example with reference to the Bitcoin protocol and as described under the heading "UTXO-Based Model" above and with reference to FIG. 2, the outputs are Unspent Transaction Outputs (UTXOs) and the inputs comprise references to the UTXOs. Thus, each transaction (except the first) comprises a backward reference to the previous transaction in the chain of dust via a spending relationship. The initial transaction does comprise an input comprising a backward reference to a funding UTXO as explained below with reference to FIG. 7C. This funding UTXO is not considered part of the chain of dust however as it does not store data or metadata relating to the chain of dust.

A chain of dust is an unbroken chain of Bitcoin inputs and outputs, which are used here to impose a spending dependency of each blockchain transaction in the sequence on its immediate predecessor. The "dust" in the context of blockchain transaction for the present disclosure is understood to be a spendable transaction for a digital asset or cryptocurrency that has an output of low or minuscule value, i.e. the value may be much less than the fees for mining the output in the blockchain.

The use of dust outputs in the transactions is advantageous and key for maintaining an immutable sequential record of all transactions as they occur for an ordered, append-only data storage system, such as an Event Stream. This is because, although by posting transactions to the blockchain all blockchain transactions would be time-stamped and remain in a particular order once they are confirmed on or added to the blockchain, this does not guarantee preservation of their sequential order. This is because transactions might be mined into blocks at different times and/or the transactions are in a different order even within the same block. The use of dust outputs that are spent by the first input of the next transaction in the sequence advantageously ensures that the order of the transaction is chronologically tracked and a tamper-proof record of both the events themselves and the sequential ordering of the events is created. This is because once mined into a block, the payment of dust from a previous transaction to a next one in the sequence ensures that, in alignment with Bitcoin protocol rules, the sequence of embedded data carrier elements, called payloads and discussed below, cannot be reordered, and no insertions or deletions may occur, which could change it without it being immediately obvious that the event stream has been compromised. In some embodiments, a double spend prevention mechanism inherent to the Bitcoin protocol ensures that the movement of cryptocurrency (e.g. dust) between different transaction inputs and outputs remains in topological order. The chaining of dust transactions takes advantage of the topological ordering to provide inter and intra block transaction (and therefore associated events and data) order preservation. Thus, this improves the integrity of ordered, append only data item storage. Furthermore, dust is the smallest output that a miner is willing to process. If a malicious third party was in possession of private keys for a given user, they would not be able to fork the dust chain. This is because any attempt to split a dust output (e.g. 273 satoshis for each output) would be ignored by a miner.

In this manner, the blockchain transactions 638 form a directed graph of transactions. It should be noted that the direction of the graph can be considered as one-way, directed from the previous transaction in the sequence to the next, as indicated by the edges (signified as arrows in FIG. 7A, notably the arrows show the direction the reference is pointing, i.e. $Tx_{n+1}$ comprises an input that comprises an outpoint of $Tx_n$. This is the opposite direction as to how time and data is progressing forward). This graph is created by the spending relationship between transactions. These spending relationships can be considered as a type of reference.

Referring to FIGS. 7B and 7C, example blockchain transaction formats for the data append transactions 640*a*, 640*b* and the initial 660 and final 662 transactions are shown. As these are blockchain transactions, they are similar in structure to those 152*i*, 152*j* described with reference to FIG. 2 however comprise specific components to relevant to the present aspect of the invention. The exact order of the inputs and outputs is not specific and alternative orderings may be used. The ordering is preferably consistent on a given chain.

The data associated with each event is stored in a payload as a part of each transaction. The data payload and/or other data to be "stored" on the transaction (such as the trigger conditions on the initial transaction) is held in an unspendable OP_RETURN output of the transaction. This is a Script opcode which can be used to write arbitrary data on blockchain and also to mark a transaction output as invalid. As another example, OP_RETURN is an opcode of the Script language for creating an un-spendable output of a transaction that can store data such as metadata within the transaction, and thereby record the metadata immutably on the blockchain.

FIG. 7B shows two data append transactions 640*a*, 640*b*. These example data append transactions 640*a*, 640*b* come after one another chronologically and in the chain of dust. The dust output 644*a* of the first transaction 640*a* is referenced in (i.e. spent by) the dust input 646*b* of the second transaction 640*b*. The dust input 646*b* of the second transaction 640*b* reference to the dust output 644*a* of the first transaction 640*a* comprises both the transaction id 648*a* of the first transaction and the index of the UTXO, which is 0 in this example case (because it's the first in the list and zero indexing is used).

All of the transactions 640*a*, 640*b*, 660, 662 comprise a funding inputs 648*a*, 648*b*, 648*c*, 648*d*. These funding inputs 648*a*, 648*b*, 648*c*, 648*d* are provided by a computing device managing creating and submitting these transactions to the blockchain. The total value of the funding input(s) is selected to cover the transaction fee (sometimes called the miner's fee) to help ensure miners will pick up the transaction and include it in a block. The funding service may provide one or more input(s) to ensure the total value is the input(s) is sufficient. The transaction fee is dynamic and will depend on the load of the network. The transaction fee can be measured in satoshis (or whatever coin/token the blockchain system uses) per byte (where a satoshi is one hundred millionth of a single Bitcoin). Therefore, if the payload is large, the fee will also need to be large and the funding input(s) will be adjusted accordingly. As a result of the UTXO model, the total fee(s) paid are controlled by the values of both the UTXO referenced in the input and the UTXO on the output. The change leftover from covering the transaction fee is optionally sent back to the same computing device managing, creating, and submitting these transactions to the blockchain via the change outputs 650*a,b,c,d*. The funding inputs and change resulting from said funding inputs operates as a float and managed by said funding service.

The initial 660 and final 662 transactions also comprise stream metadata 664, 666. The initial stream metadata comprises values relevant to the maintenance of the chain(s) of dust. The metadata 666 of the final transaction 662 comprises information to signify that this transaction is the last in the chain. Preferably, the metadata 666 of the final transactions also comprises the transaction id 648*c* of the first transaction 660.

Both data append transactions 640*a*, 640*b* comprise payloads 642*a*, 642*b* respectively. In some embodiments of the present aspect, the payload 642*b* of the n+1 transaction 640*b* comprises a reference to the payload 642*a* of the preceding n transaction 642*a*.

Current State of the Stream

As discussed above with reference to FIG. 6A, the current state of the stream and/or data indicative of the current state of the stream is stored on the output of an append transaction. Preferably, the current state of the stream is represented with the latest event in the event stream. In one embodiment, the data indicative of the latest event is in the form of the payload below. This is provided as an illustrative example and some embodiments comprising modifications are discussed below.

Payload$_n$=[preimage$_n$][streamDigest$_n$][ . . . ].

Here, the subscript n is used to signify the present transaction and n−1 is the preceding transaction. Preferably, the payload is stored in the script of an output of the transaction in the form:

OP_FALSE OP_RETURN OP_PUSHDATA1<preimage>0x20<streamDigest> [0x20 <data digest>|OP_PUSHDATAN <data>]

The preimage comprises metadata of the current transaction, event, or event stream state and previous transaction, event, or state of the event stream. For illustrative purposes, the state of the event stream is used below. A skilled person will understand the preceding transaction, previously received event, or previous state of the event stream may be used and optionally that they may all be the same thing.

Where "previous state of the stream" or "preceding state of the stream" are used, this preferably refers to the event stream state as recorded in the off-chain dataset. Optionally, this may also be the same as the on-chain dataset if all events/updates to the stream state are recorded on-chain.

The preimage optionally comprises any one or more of the following fields:

txidcreate: A reference to the first transaction in the chain, preferably the transaction id of the first transaction in the chain, index: An index of the data or event, whenRecorded: A time associated with the creation of the transaction and/or data item, dataDigest$_n$: A hash of the event data as it is stored off-chain (and optionally stored on the transaction in the event data representation of the payload ([ . . . ]), and streamDigest$_{n-1}$: A hash of the preimage of the preceding state of the event stream (also described as the stream digest of the preceding state of the event stream, or the stream digest reference) or a seed of the first transaction (if the transaction is the second transaction in the chain as the first transaction does not comprise a streamDigest).

The stream digest (streamDigest) is a hash of the preimage (preimage).

Optionally, the streamDigest is also salted. A salt, which is a unique value, may be randomly generated for each transaction associated with an event stream. The salt is optionally stored off-chain. Salting data provides the advantage of revealing nothing and preventing brute force preimage attacks, such as brain wallet attacks.

Further example features and uses of the salted hash are discussed throughout the specification of UK Patent Application No. 2102217.3 filed on 17 Feb. 2021 in the name of nChain Holdings Limited.

The event data representation section of the payload ([ . . . ]) optionally comprises the data item to be stored on the blockchain. The data item may be one of:

data itself to be stored on the blockchain,
a hash of the data,
a subsection of the data to be stored on the blockchain, or
nothing and/or empty.

Notably, the preimage comprises both a hash of the event data (dataDigest) and the streamDigest of the preceding state of the event stream. This way, a chain of hashes is constructed such that if data from a preceding event in the event stream (any preceding event including the create transaction, not just the previous one) is modified in some way a different preimage will result and therefore the streamDigest will be different. With a different streamDigest, the next event item will also have a different preimage and therefore different streamDigest and thus a cascading change in all of the following streamDigests results from any modification of an earlier event item. Thus, the back referencing of streamDigests in the preimages provides a mechanism to identify if anyone has tampered with a preceding event item as the streamDigests would need to be recalculated and updated.

Coupling this feature to the fact transactions on the blockchain are immutable once confirmed, it is possible to identify whether any event item has been modified since the transaction has been confirmed. A further advantage of this present mechanism is that the complete event is not needed, only the streamDigest of the event. Further still, the entire dataset is not needed to detect tampering of a previous event. Taking the streamDigest of any event as stored on the blockchain and comparing it to the off-chain database is enough to confirm whether any events have been modified prior to transaction comprising the streamDigest being confirmed on the blockchain. Verification is described further under the heading "Event Stream Blockchain Verification".

The type of data stored in the event data representation section of the payload is dependent on the configuration the event stream. The create message comprises the method a client wishes to select and the data storage type. There are three different methods a client can select: onFinalise, checkpoint, and onEvent. These different methods modify how frequently the data is submitted to the blockchain and are discussed further under the "Trigger Conditions" heading.

For at least the onEvent method three different data storage types are possible: attest, notarise, and publicise. attest provides a minimal amount of data such that the event can be located and/or verified with data stored in a database or data stored by a client. Preferably, attest stores only the streamDigest. The notarise data storage type does not store any data either and preferably stores both a dataDigest (i.e. a hash or salted hash) and the streamDigest. In some embodiments, the preimage may also be present. The publicise data storage type stores the event data itself and, if the data is large, across two or more transactions. The checkpoint method does not store the data on the blockchain. Preferably, the checkpoint method stores the streamDigest. In some embodiments, the preimage is also present. Alternatively, the checkpoint method also uses the three different data types. The table below provides a summary of the above.

| Method | Data Type on Chain Value | Large Data | Data to be stored on-chain |
|---|---|---|---|
| onFinalise | N/A | N/A | |
| checkpoint | N/A | N/A | [streamDigestn] |
| onEvent | attest | N/A | [streamDigestn] |
| | notarise | N/A | streamDigestn][H(datan)] |
| | publicise | No | [preimagen][streamDigestn][datan] |
| | | Yes | [preimagen][streamDigestn][split(datan), 1of2] |
| | | | [preimagen][streamDigestn][split(datan), 2of2] |

Trigger Conditions

As mentioned above, the three different methods will change how frequently data is submitted to the blockchain. At least two datasets are created: off-chain dataset which comprises all of the events (and event data) in the event stream, and an on-chain dataset which will comprises data indicative of a subset or at least a subset of the off-chain dataset.

For the onFinalise method, no transactions are submitted to the blockchain except for the create transaction and a finalise transaction. Thus, the trigger condition for the onFinalise method is reception of a message to end the stream. Thus, the on-chain dataset comprises only two items.

In situations where events in the event stream should not be made public (such as in a voting system extending over only a short period of time), the onFinalise method may be used. The onFinalise method will not store any event related data on the blockchain other than create and finalise transactions. Once concluded, the final transaction can comprise metadata or statistics about the vote (such as total number). A final streamDigest in the finalise transaction, as discussed above, can be used to verify that the whole chain has not been tampered with.

For the onEvent method, every event that is added to the off-chain database will also have data representative of it on the blockchain. The type of data stored on the blockchain depends on the data storage type as discussed above. For onEvent, the trigger condition is upon reception of an event. Thus, every time an event is received or created, or any time the event stream is updated, the platform processor is triggered to add the event to the blockchain. The platform processor will look at the data type (attest, notarise, and publicise) and generate the appropriate data to add to the blockchain. The on-chain dataset for this onEvent embodiment comprises every item that is also present in the off-chain dataset. The same data may not be present, however. For example, if the attest data type is used, then the actual event data is not present on-chain, only the streamDigest of each event.

Where the presence of an event occurring and/or actual content of the event is relevant to the public, the onEvent method may be used. An example usage of this method is in an honest tender process. In this example case, it is in the public interest to know that tenders have been submitted and by who. The presence of the events in the public blockchain achieves this purpose. Optionally, depending on the data type to be stored, the contents of the event may also be present thus making even more of the tendering event public. Where the bids need to be kept secret, the notarise and/or attest datatypes can be used to hide the event content.

For the checkpoint method, two example embodiment trigger conditions are provided. The first being time based (as discussed briefly in the example in FIG. 6B) and the second being based on the number of events received (not dissimilar from the onEvent method, except instead of it being every event, it's every nth event). The on-chain dataset in this embodiment comprises at least some (or optionally all) of the items in the off-chain dataset. The same data may not be present, however. For example, the checkpoint method's data storage type does not comprise the actual event data and includes the streamDigest of each event. In some cases, the preimage may be included.

Not storing the data, or even a representation of the data, reduces the size of the transaction being submitted to the blockchain. As transaction fees are usually calculated based on the size of the transaction, this, therefore, saves the platform processor and/or client money while also providing the advantages of having the event stream represented at least partially on an immutable blockchain as described throughout the specification. Similarly, submitting only a portion of the events provide similar advantages about reducing total transactions, total data stored on the blockchain, and saving money for all parties involved.

Further to the above, a reduction in the size of the transaction and submitting data to the blockchain less often, e.g. on checkpoint or onFinalise results in a reduction in the associated carbon footprint of said transaction. A larger transaction size results in greater processing required. Where a Proof-of-Work consensus mechanism is used (such as Bitcoin and its derivatives), this energy saving is particularly relevant as said consensus mechanism is a computing intensive and therefore energy intensive process that can result in a large carbon footprint.

In cases where an event is triggered whenever a transaction is submitted to the blockchain, an endless loop can occur if using the onEvent method (and/or when the checkpoint method is configured to make the threshold 0 or 1, which results in the same or similar data being submitted to the blockchain as the onEvent method). The endless loop will result because when the first transaction is submitted (no matter what causes it), the onEvent mechanism triggers a further transaction to be submitted to the blockchain, which in turn triggers a yet another event to be submitted to the blockchain, ad infinitum. This problem can be avoided by using a triggering mechanism as described below. By using either of the triggering mechanisms described below, this problem is avoided entirely.

Further advantages of all of the methods (onEvent, checkpoint, and onFinalise) are made apparent with respect to verification as described below under the heading "Event Stream Blockchain Verification".

The time-based trigger condition is such that the blockchain event stream is updated at a given time interval. The time interval is set by the client and is a parameter in the create message. Preferably, the time interval is constant and does not change through the lifetime of the event stream.

The timer-based trigger condition is optionally implemented using a language level timer, for example a Java Timer and TimerTask. Continuing with the Java example, a create message is received that comprises an indication that a timer based trigger condition is to be used and a specific time to wait between event submissions to the blockchain is also present (every minute for example). A Timer is established to trigger at a period according to the specific time to wait between event submissions. A TimerTask is also established to obtain the current event stream state and arrange for that current event stream state to be submitted to the blockchain. Every time the Timer triggers, the TimerTask is run. Example pseudo Java code may look like:

```
final long period = 1000L * 60L; // 1 minute, from create message
public void updateBlockchain_timerBasedTrigger( ) {
    TimerTask repeatedTask = new TimerTask( ) {
        public void run( ) {
            // obtain data indicative of a state of the stream
            // generate a transaction comprising said data
            // broadcast the transaction to the blockchain
        }
    };
    Timer timer = new Timer("Event Stream Update");
    timer.scheduleAtFixedRate(repeatedTask, new Date( ), period);
}
```

Alternatively, an operating system level scheduler is used such as cron. An example crontab setting to run every 5 minutes could look like:

/5****/usr/bin/java My Class.TimerTask( )

A person skilled in the art will appreciate that there are further ways to establish timer-based execution beyond the two examples provided here. These are provided as examples only for a skilled person to understand a possible way to implement timer-based triggering.

As an alternative, or in addition to the above timer-based trigger condition, a trigger condition based on the number of events received is used. A given number of events is set in the create message (for example 10). This given number is considered the threshold number of events to trigger updating to the blockchain. Every time an event is received, the total number of events received since the previous on-chain stream update (or since the create message was received if no on-chain stream updates have been made yet) is compared with the threshold number of events. Based on that comparison, the on-chain dataset is updated. The comparison is preferably based on whether the number of events received is equal to or greater than the threshold number of events. Example pseudo Java code may look like below (where numberOfEventsBasedTrigger is called every time an event is received or event stream is otherwise updated):

```
final int thresholdEventReceived = 10; // from create message
static int numberEventsReceived = 0;
public void numberOfEventsBasedTrigger( ) {
    Task repeatedTask = new Task( ) {
        public void run( ) {
            // obtain data indicative of a state of the stream
            // generate a transaction comprising said data
            // broadcast the transaction to the blockchain
        };
    };
    numberEventsReceived += 1;
    if (numberEventsReceived >= thresholdEventReceived) {
        repeatedTask.run( );
        numberEventsReceived = 0;
    }
}
```

Preferably only one trigger condition is possible (timer-based or number of events based). Alternatively, both trigger conditions can be used and then each time either of the trigger conditions is met, the on-chain dataset is updated.

The "obtain data indicative of a state of the stream" step in the examples above preferably will be to obtain the latest event and extract or generate the streamDigest, and in some embodiments also the preimage of the latest event stream event. The "generate a transaction comprising said data" and "broadcast the transaction" steps preferably comprises sending a message to the message bus for the platform service to submit the transaction to the blockchain asynchronously to the above method and in a different thread, process, or device. These steps are substantially the same or similar to those of the method as described with reference to FIG. 6A and are provided as examples of said method.

Optionally, if the checkpoint method also comprises a data format option (attest, notarise, and publicise), then the data will be formatted according to the appropriate scheme.

Updating Off-Chain Dataset with On-Chain Metadata

Once the transaction has been broadcasted on the blockchain and/or confirmed on the blockchain, optionally the off-chain database is updated with metadata of the transaction. This way, a user verified with access to the database can more easily locate the dataset as it is represented on the blockchain. This may be useful for verification purposes.

Optionally, the metadata is used to verify the presence of the transaction in a block on the blockchain. Optionally, the metadata is used to construct a proof of inclusion of the transaction into the blockchain.

The metadata of the transaction may be any one or more of the following: a transaction id of the append transaction, a subset of the input(s) to the append transaction, a block header the append transaction is stored on, a block id the append transaction is stored on, a timestamp associated with the append transaction, and an array of sibling hashes for the transaction id of the append transaction.

Preferably the proof of inclusion is a Merkle tree proof. A Merkle tree proof is a known authenticated data structure organized as a tree. The hash of each data block is stored in a node on the base layer, or leaf, and every internal node of the tree, or branch, contains a cryptographic hash that is computed from the hashes of its two child nodes. The top node of the tree, the Merkle root, uniquely identifies the dataset from which the tree was constructed. Thus, Merkle trees allow for an efficient proof-of-inclusion, where a miner or a prover node shows to a submitter or a verifier node that a certain data block is part of the authenticated dataset by sending them a proof with an audit path. The audit path contains the node hashes necessary to recalculate the Merkle root, without requiring the submitter to reveal the whole dataset. In Bitcoin SV, the transactions contained in a block are stored in a Merkle tree.

Preferably the metadata of the transaction comprises a transaction identifier (TxID) of the append transaction, a block header of the block in which the blockchain transaction is included, and an array of sibling hashes for the transaction identifier (TxID). The array of sibling hashes being used to construct said audit path and thereby being comprised in the proof The hashes are referred to as the Merkle Inclusion Proof.

Preferably, the block header independently sources from the inclusion proof (i.e. using a blockhash—which is part of the inclusion proof). Headers are independently available from the blockchain itself or by using a Headers Client, which is explained in GB patent application 2106950.5 filed on 14 May 2021.

An auditor should ensure that the indicated header is actually part of the longest chain.

Further example features and uses of the proof of inclusion are discussed throughout the specification of UK Patent Application No. 2102217.3 filed on 17 Feb. 2021 in the name of nChain Holdings Limited.

Checkpoint Now

If the checkpoint or onFinalise method is used, an optional checkpointNow flag is optionally used. When a new event is received for storage in the off-chain dataset (and potentially in the on-chain dataset if the appropriate trigger condition is met), the checkpointNow flag can optionally be set. If the flag is set, it will force, irrespective of whether any trigger condition has been met or not, data associated with the received event to be stored on the on-chain dataset. The check can be considered an override flag as it overrides the checkpointing method to force data to be added to the on-chain dataset.

Thus, upon reception of an event to add to the event stream, if the flag is set, the event data, or data based upon the event data is added to the on-chain dataset.

The type of data to be included in the on-chain dataset depends on the data format option (attest, notarise, and publicise).

Advantageously, this gives more freedom to the client submitting data to the event stream to allow or require that important data or events are committed to the on-chain dataset for auditing. Important events could include passing particular milestones for the event stream such the data being stored resulting in reaching a particular state in an associated finite state machine or smart contract.

Another advantageous use this technical feature could enable would be to allow for a stream to be settled at particular important times that the checkpoint method might not capture. If for example, the checkpoint method is used to add data to the on-chain dataset midday every day, but a client wishes for the current event to be recorded on midnight on the last day of the financial year (for financial reporting purposes), then the client simply adds the checkpointNow flag to the last event they submit before midnight and it will be added to the on-chain dataset for auditors to review irrespective of any previous checkpoint trigger conditions being set.

Event Stream Blockchain Verification

A second aspect of the present disclosure generally relates to a computer implemented method of verification of on-chain and off-chain datasets as a part of a platform that provides a plurality of services that are associated with a blockchain. The platform being provided for a plurality of clients and implemented by at least one platform processor being associated with an application programming interface (API).

The computer implemented method for verifying a blockchain stored representation of a dataset, comprising the steps of obtaining a reference to an on-chain dataset, the on-chain dataset being stored on the blockchain and comprising data carrying transactions, wherein each data carrying transaction comprises data indicative of an event stored in an off-chain dataset, traversing the on-chain dataset and for each data carrying transaction in the on-chain dataset determining that the data indicative of an event in the off-chain data set is associated with an event in the off-chain dataset, and verifying that the on-chain dataset and the off-chain dataset correspond to each other.

Preferably the blockchain is a public blockchain. Advantageously, with a public blockchain and/or with a blockchain with capabilities to allow third parties to read the blockchain, any interested party, whether they submitted the data, are storing the data, or are a third party completely can audit the on-chain and off-chain datasets to ensure they correspond to each other. In particular the present method provides a way to allow a third party to verify data in a trustless manner. The immutability of the blockchain itself provides a way to store data indicative of events such that it is nearly impossible to modify the event related data after submission to the blockchain.

In some embodiments, the data items in the off-chain dataset comprise at least a preimage and a digest of the preimage. Preferably the data indicative of the data of the off-chain dataset comprises a digest of a preimage of a data item in the off-chain dataset. More preferably, the step of determining that the data indicative of the data item in the off-chain data set is associated with a data item in the off-chain dataset comprises locating a data item in the off-chain dataset with the same digest of the preimage of the on-chain data item.

Preferably, the preimage comprises metadata of the event associated each data item is associated with.

Advantageously, the digest of the preimage acts as a proof of existence of the off-chain data. Using only the digest of the preimage (called the streamDigest throughout the description), an interested third party can try find a corresponding event which has a preimage that hashes to said digest. The digest used presently is a one-way digest such that it is prohibitively computationally difficult for a bad acting client or storage provider to find and substitute "bad" event data that has the same digest as the intended "good" event data. If such an event with matching digest can be found, then the auditor can be confident of the validity of its non-tampering. The immutability of the blockchain further enhances this security as it limits the ability of a malicious blockchain miner to tamper with historical data.

Further advantages can be seen in that the entirety of the event data can be verified using only the digest, which is much smaller in size compare to the event data itself. Thus saving data on the blockchain and processing power and therefore reducing the carbon footprint of any associated blockchain devices or processes that operate on or store event related transactions.

In some embodiments, the data indicative of the data item of the off-chain dataset additionally comprises a preimage of a data item of the off-chain dataset. Preferably the step of determining that the data indicative of the data item in the off-chain data set is associated with a data item in the off-chain dataset comprises locating a data item in the off-chain dataset with the same preimage as the on-chain data item.

In some embodiments, the data indicative of the data item of the off-chain dataset further comprises a hash of an event. Preferably the step of determining that the data indicative of the data item in the off-chain data set is associated with a data item in the off-chain dataset comprises locating a data item in the off-chain dataset which has the same hash of an event.

Advantageously, the presence of the preimage of the event and/or a hash of the event itself allows for finer grained verification of the on-chain and off-chain datasets. While the digest of the preimage can confirm whether data has been tampered with, by using the preimage and/or a hash of the event, a verifier can check which parts of the on-chain event have been tampered with.

In some embodiments, the data indicative of the data item of the off-chain dataset further comprises the event and/or a subsection of the event. Preferably the step of determining that the data indicative of the data item in the off-chain data set is associated with a data item in the off-chain dataset comprises locating a data item in the off-chain dataset which has the same event and/or subsection of the event.

Advantageously, with the event data itself, a verifier can verify further any smart contract, finite state machine, or other process that uses said event data. A verifier can not only verify the data is valid, but also use the data in a similar or the same way the client writing the data wishes to use the data. The same advantages above about finer grained verification also apply.

In some embodiments, the preimage comprises a digest of the preimage of the preceding data item in the off-chain dataset.

Advantageously, this chained storing of hashes adds further strength against bad actors attempting to modify historical data. With each preimage depending on the preceding event, a modification of an event in the past will propagate through to a modification of the preimage of any and all events stored afterwards. This propagation appears as a change of digest through the entire chain from the point where an even is changed forwards.

In some embodiments, each transaction in the on-chain dataset comprises a reference to a further transaction such that a chain of transactions is formed. Preferably, traversing the on-chain dataset comprises obtaining a given transaction in the on-chain dataset, and obtaining a further transaction based on a first reference in the given transaction or based on a second reference in the further transaction. Optionally, the reference to the on-chain dataset is a reference to a first or a last transaction in the chain of transactions. Optionally, wherein the reference to the on-chain dataset comprises a transaction id of the first or the last transaction in the chain of transactions. Optionally the reference to the on-chain dataset comprises a block id of the first transaction.

Advantageously, having each transaction reference another one in a chain like manner enforces a spending order to the transactions. This order can be used for verification purposes for example to check that the events on-chain are in the same order as those off-chain. A further advantage is the traversability of the chain of transactions. These transactions can be traversed using the transaction information (i.e. the spending outpoints) alone without any further indexing or other additional information on top.

In some embodiments, the method comprises the step of obtaining data items in the off-chain dataset. In some embodiments, each data item of the off-chain dataset is obtained by accessing a database and/or by accessing a data storage that substantially mirrors the database.

Advantageously, accessing a data storage that substantially mirrors the database, an auditor need not overload a potentially currently in use database with data access calls to verify historical data.

Also according to the second aspect, a device comprising a processor and memory, the memory including executable instructions that, as a result of execution by the processor, causes the device to perform the computer-implemented method as described above.

Also according to the second aspect, a system comprising the device as described above configured to audit the on-chain and off-chain datasets, and a third-party device configured to receive the outcome of the audit.

Figure 8:
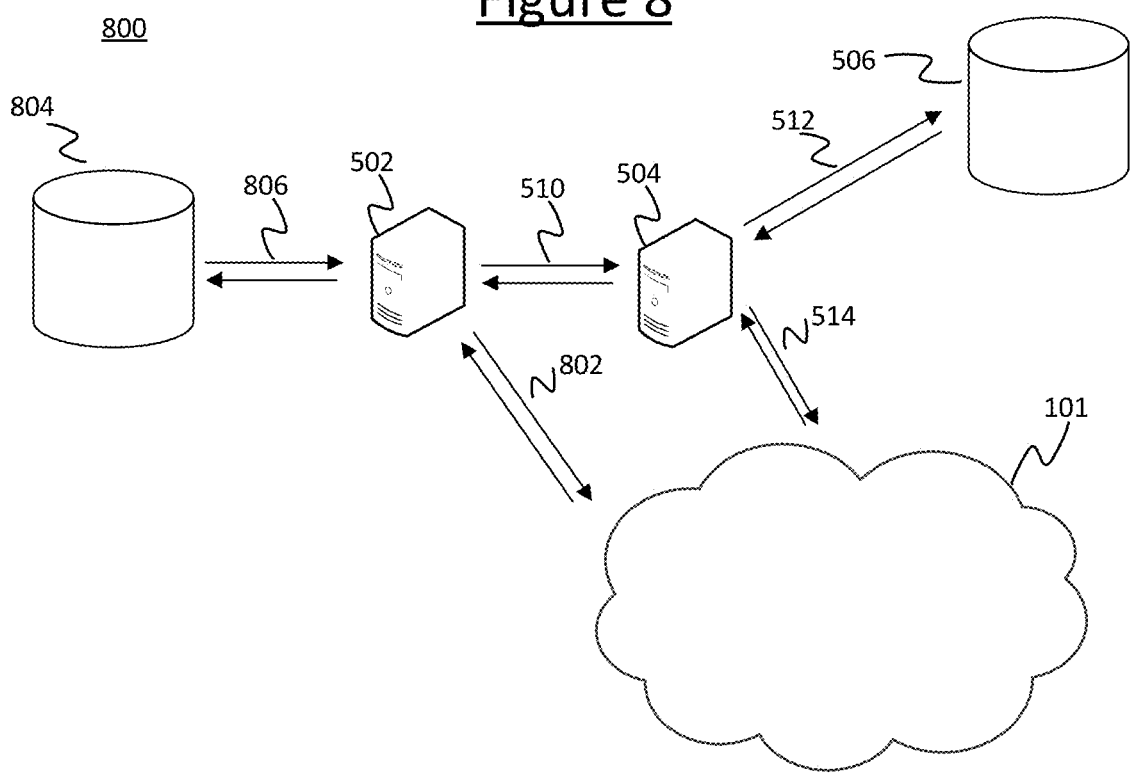
FIG. 8 is a schematic diagram illustrating verification of a dataset at represented in a blockchain.

Referring to FIG. 8, a system 800 according to a second aspect is shown with the same or similar components to that as described with reference to FIG. 5. The same reference numerals have been used between FIGS. 5 and 8 where relevant to show the same or similar device or communication channel is used. A client device 502 is shown in communication 510 with a platform processor 504, in communication 802 a blockchain network 101, and in communication 806 with a client database 804. The platform processor 504 is in communication 514 with the blockchain network 101 and in communication 514 with a platform database 506.

The client 502 is in communication 802 with a blockchain network 101 such that it is able to download and/or query a node in the network for blocks and/or transactions in the blockchain. Optionally, the client 502 stores a local copy of the blockchain. The client 502, while in communication with the blockchain network 101, is not configured to submit data for inclusion on the blockchain for the purposes of this aspect.

The client 502 is optionally in communication 806 with the client database (or datastore) 804 to store the data submitted to the platform processor 504. In this case, the event dataset will be stored in at least two places: the client database 804 and the platform services database 506. And further, the blockchain will store an on-chain representation of the event dataset which is optionally a complete reproduction of the dataset. Optionally, the dataset is not stored in its entirety by the client 504 on the client database 804 and each event in the off-chain dataset is obtained via the platform processor 504.

Figure 9:
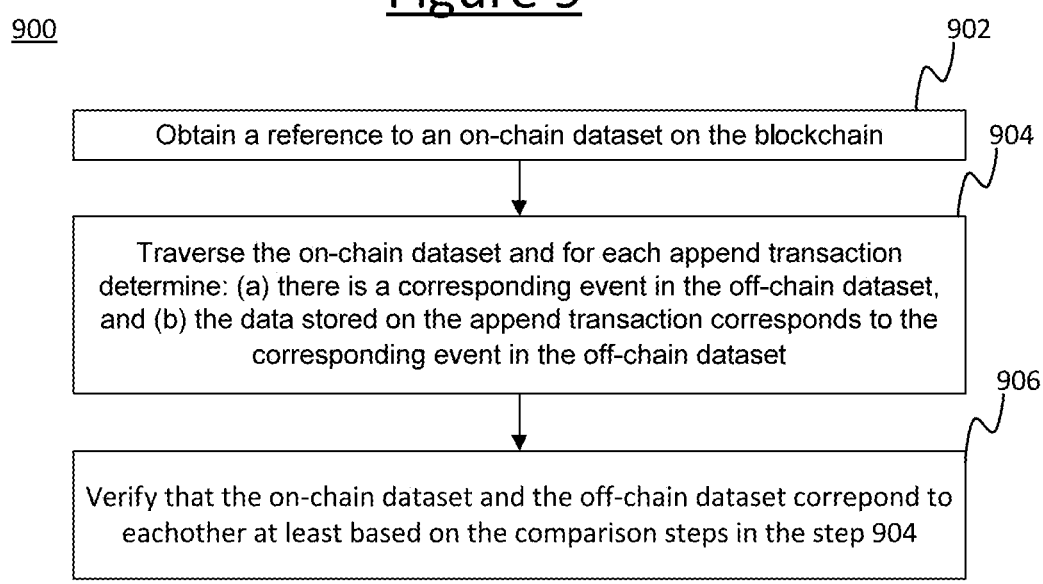
FIG. 9 is a flowchart depicting a method for verifying an on-chain dataset with an off-chain stored event stream.

Referring to FIG. 9, a method 900 of verifying an event dataset is shown. This method can also be considered a method of auditing an event dataset. The dataset is a set of events and the source of each event is from the client that creates it and/or any party with authority delegated by the client. The verification is presented as being conducted by the client however a skilled person will appreciate that any party including the client, the platform processor, and other third parties can also conduct said method as long as they have read access to both the blockchain (which is usually public, although not always), and to the off-chain dataset. The third-party would have access to the dataset via a delegated read access to the platform processor's database (via the platform processor's API) and/or provided by the client from their own storage of the dataset. The third party is optionally an auditor.

In the first step 902, the client obtains a reference to the on-chain dataset they are wanting to verify with the off-chain dataset. The on-chain dataset is preferably stored as a chain of transactions such that each transaction comprises a reference to an adjacent transaction. Preferably, the reference to the on-chain dataset is a transaction id of one of the transactions in the chain of transactions. More preferably, the reference to the on-chain dataset is a reference to the first or last transaction in the chain of transactions. Preferably, the chain of transactions is as described with reference to FIGS. 7A, 7B, and 7C above.

Alternatively, the reference to the on-chain dataset is a reference to a list of transaction references.

With the reference to the on-chain data set obtained, the transactions that are part of the on-chain dataset are traversed 904 or otherwise obtained. The methods of traversal will depend on the structure the transactions are stored in. More detail is provided below under the "Traversing an On-Chain Dataset" heading.

Each data carrying transaction in the on-chain dataset comprises data indicative of an event that should be stored in the off-chain database. A preferred method of how these on-chain representations are stored on the blockchain is described above under the heading "Event Stream Blockchain Storage" and each data carrying transaction is an append transaction as described above with reference to FIG. 7B. In this example, a subset of all of the events will be represented in the on-chain dataset. As described above, the append transaction can comprise different types of data indicative of an event in an off-chain dataset such as any one or more of a hash of a preimage, the preimage, a hash of event data, and the event data. The different data types and structures are described in greater detail under the heading "Data Indicative of an Event Stored in an Off-Chain Dataset".

For each data carrying transaction in the on-chain dataset, a determination is made that the data present in the on-chain transaction is associated with an event in the off-chain dataset. This step can be considered as a verification step as it is to verify whether the transaction and/or data comprised within the transaction validly represents an event in the off-chain dataset. The verification/association step comprises checking an event corresponding to the data present in the on-chain transaction is present in the off-chain dataset and it is valid with said off-chain event. The verification optionally includes a comparison of the data, a comparison of time stamps, and/or a comparison of any other metadata available.

Notably, it is not always the case that all of the off-chain events are represented in on-chain transactions, as such the method is only checking that all of the on-chain recorded events are valid. For example, when the checkpoint method is used as described above, the trigger condition is optionally set such that not all of the events are represented in the on-chain dataset.

Based on at least these on-chain dataset verifications, a determination as to whether the entire on-chain data set is representative of the off-chain dataset. This can also be described as verifying that on-chain dataset and the off-chain dataset correspond to each other. Preferably, in some embodiments, for the on-chain dataset to be validly representative of the off-chain dataset, then all of the on-chain data carrying transactions will have an associated event in the off-chain dataset and that associated event is validly represented by the on-chain transaction.

Preferably, in other embodiments, i.e. for time-based (trigger) checkpoint, an on-chain transaction may not have a direct off-chain event. In this case, the on-chain transaction may be associated with the last written event. However, if no new event is added between consecutive time periods, then the on-chain streamDigest will be unchanged. This suggests the absence of activity during that period. The streamDigest encompasses every bit of the stream, so whenever the StreamDigest is written on-chain it protects the integrity of all data that was written before that time.

The verification 906 of the on-chain and off-chain datasets may also comprise a comparison of metadata stored on the on-chain dataset with the off-chain dataset. Preferably, metadata of the on-chain dataset is stored on the initial and/or final transactions in the on-chain dataset. For example, the finalising time between the two datasets may be compared to ensure that they are the same or appropriately close. The total number of events may be stored on the final transaction and this may be compared with the total number in the off-chain dataset.

Any party can, using the methods and systems described herein, depending on different use cases and datatypes, confirm any one or more of the following:
  Does the dataset include only elements that should be included?
  Does the dataset include all elements that should be included?
  Has the data of each element been faithfully recorded?
  Has the order of the events been faithfully recorded?
  Has the time of each event been faithfully recorded?

Preferably, the verification step 906 comprises verifying any one or more of the following of both the on-chain and/or off-chain dataset:
  the dataset includes only elements that should be included,
  the dataset includes all elements that should be included,
  the data of each dataset are correctly recorded as compared to each other,
  the order of the events in the dataset is correct, and
  the time of each event in the dataset is correct.

Preferably the off-chain dataset comprises all of the events and the on-chain dataset comprises a subset of the events.

Preferably, the verification step comprises traversing the off-chain dataset and verifying that all events that should be recorded in the on-chain dataset are recorded there.

In some embodiments, the traversing of the on-chain dataset may be done in response to locating an off-chain event that should have a corresponding on-chain event. That is to say, if iterating through the off-chain dataset to verify there are values that should be included on-chain, this would trigger said traversal of the on-chain dataset to locate said event. The traversal may be incremental such that the order is additionally checked as well as any other verification steps (such as data integrity or time) or start from the start of the on-chain dataset so as to check with each event present in the on-chain dataset.

In other embodiments, for on-chain traversal it may be preferable that the blockchain is fully indexed prior, and transactions in the stream would be fetched one by one.

In embodiments, where a preimage is not written on-chain, which may be the case for some embodiments of the checkpoint method and (salted) notarisation, i.e. notarise, there may be insufficient on-chain data to perform the calculations that proves the expected data has been properly accounted for. This means that an auditor or verifier may need to obtain the missing information from the platform, i.e. for the metadata that comprises the preimage. The $metadata_n$ includes; stream seed, $streamDigest_n$, $whenRecorded_n$, event index n, delegatedWriter index, $salt_n$ and optionally a copy of event $data_n$. It is preferable that an auditor entity need not read any blockchain transaction.

Advantageously, in some embodiments, the platform may provide full transaction data, the Merkle inclusion proof (an array of hashes) and the blockhash of the header of the block that contains the full transaction data. The full transaction data always includes at least the streamDigest in one of its outputs.

In this case, an audit or verification process may comprises the following steps:
  A. Fetch the off-chain record of every event starting at the beginning.
      The record will include; event $metadata_n$ plus a copy of the on-chain transaction ($txn_n$), output index used for OP_RETURN ($out_i$) and the Merkle inclusion proofs ($P_n$) (if any).
  B. Prepare the original data sent to EventStream for use in the construction of the preimage.
      $H_n := sha256(data_n | salt)$
  C. Using $H_n$ and the information returned from the platform, construct the $preimage_n$ (includes metadata elements; $whenRecorded_n$, delegated writer index, event index n) and $streamDigest_{n-1}$ from the previous preimage calculation.
      For $preimage_0$, $streamDigest_{n-1}$ is replaced by a 'seed' value (also returned in the metadata).
      Calculate $streamDigest_n$
      Compare the calculated $streamDigest_n$ with the streamDigest supplied in $metadata_n$
      If identical, this can be taken as proof that data caused the creation of $streamDigest_n$ and the whole stream from index 0 to n−1 has not been altered.
  D. If $P_n$ is included, proceed to validate that $streamDigest_n$ has been recorded on-chain
      Extract the data carrier output (i.e. $streamDigest_e$) held in $out_i$ of $txn_n$
      Format is: op_false op_return 0x20<$streamDigest_e$>
      Compare the calculated $streamDigest_n$ with the extracted $streamDigest_e$
      If identical, this can be taken as proof that $streamDigest_n$ is part of $txn_n$
  E. Compute the Merkle root
      Calculate $H_D := sha256(sha256(data_n))$
      Calculate the Merkle root $R_n := merkle(H_D, P_n(nodes))$
  F. Get the blockheader
      Send $metadata_n$. blockhash to a Headers Client to obtain the actual header $H_B$ metadata$_n$. blockhash may use to sha256(H$_B$) or sha256 (sha256(H$_B$)), depending on the hash applied. In other words, blockhash could use any hash function and sha256 or sha256(sha256(header)) are exemplary.

G. Compare H$_B$(merkleRoot) with R$_n$

If identical, it proves that txn$_n$ is part of the block that has a hash that matches the blockhash Therefore, this can be taken as proof that data$_n$ was provably added to the EventStream at the specified index and time.

Preferably, where the verification step comprises verifying that the on-chain dataset comprises all of the events that it should, the method comprises locating the off-chain events that comprise on-chain metadata, and, for each event, verifying that the metadata correctly corresponds to the on-chain transaction representative of the event. Preferably, the metadata comprises a proof of inclusion in the blockchain. More preferably, the step of verification comprises verifying the proof is correct. In some examples, as mentioned above (see steps of the audit process) in practice a user obtains a certificate from the platform processor, which includes for their transaction, the transaction ID, corresponding block ID, Merkle Root and Inclusion Proof If this information was stored off-chain, it would be possible to independently verify it by checking whether the Tx ID and Merkle Inclusion proof provided the same Merkle Root as that of the block that the transaction is claimed to be in.

Preferably the metadata and/or proof of inclusion is as described with reference to the discussion under the heading "Updating Off-Chain Dataset with On-Chain Metadata".

This method 900 optionally is used to verify event streams off-chain and on-chain as created by the method 500 described above.

In verifying that the data indicative of an event stored on-chain is stored off-chain, the verifying device also obtains the off-chain dataset. The verifier (client 502, platform processor 504, or third-party auditor) obtains each item in the off-chain dataset one by one or obtains the dataset as a whole. Usually, the client 502 will have read access to the off-chain dataset they have just been writing to. Optionally, before or during the verifying process, the client obtains the entire off-chain dataset so that they can undertake the verification steps so that multiple requests to the platform processor 504 are not necessary, thus saving time and bandwidth. Alternatively, for each on-chain transaction a verifier is wanting to verify, a request to the platform processor 504 is made for the off-chain stored event that is relevant to the present on-chain transaction.

Additionally, or alternatively to the above, in the case where the client 502 was the one writing to the platform processor 504 (and/or the client 502 had visibility of the data as it was being sent to the platform processor 504), the client 502 stores the data as it is being written such that the client 504 maintains their own version of the dataset in their own database 804. This way, no additional messages are required to be sent to the platform processor 504. If the client 502 is wishing for a third party to verify the data, they can either provide their stored version (if present) or delegate read access to the third party.

Finally, the verifier optionally transmits the determination made regarding whether the on-chain dataset validly represents the off-chain dataset. This determination is transmitted to the party that requested the verification be done and/or any other interested party.

Traversing an On-Chain Dataset

In the traversal step 904 discussed above in the verification method 900, the on-chain dataset is traversed. The traversal method will depend on the type and format the on-chain dataset is stored in. Below there is provided a number of example embodiments for different on-chain formats and possible methods of traversing them. A person skilled will appreciate that traversal methods for different data structures may be possible.

As discussed above, the on-chain transactions preferably are in a chain such that each transaction comprises a reference to an adjacent transaction, and more preferably that reference can be followed either direction i.e. if transaction A comprises a reference to transaction B, you can, starting from transaction B, follow the reference (in reverse) to transaction A in addition to, starting from transaction A follow the reference to transaction B. Event more preferably, the transactions form a chain of dust as described above under the heading "Chain of Dust". Each transaction (except the first) in this chain of dust comprises a backward reference in the form of spending an outpoint of a previous transaction.

To traverse forwards through the chain, the "dust output" 664$a,b,c$ outpoint is taken, and the transaction that spends that output will be the next transaction to operate on. This step is taken repeatedly until the end of the chain is reached.

To traverse backwards through the chain, the outpoint that is stored in the "dust input" 646$a,b,d$ is retrieved. The transaction id in that outpoint is the transaction id of the previous transaction in the chain. The transaction with that id is located. These steps are taken repeatedly until the start of the chain is reached.

Thus, if the on-chain data set is of the form of a chain of transactions, traversal of the on-chain dataset comprises following the references each transaction comprises until all of the on-chain transactions have been visited. As shown above, it is possible, starting from any transaction in the chain, to traverse forwards or backwards by following the reference. Thus, it is possible to traverse the entire chain from any starting point. Where the reference to the on-chain dataset is a transaction in the middle of the chain, then to traverse the entire set, the verifier traverses one direction until meeting the first or last transaction, then traverses the other direction starting again from the same transaction from the middle of the chain.

Alternatively, when the reference to the on-chain dataset is a reference to a list of transactions that relate to the events stored off-chain. Preferably the transaction references are the transaction id of each transaction on the on-chain dataset and more preferably the block id as well as the transaction id.

With only a transaction id, a transaction can be found by iteration through all of the transactions in the blockchain (or using a blockchain services that has already indexed all the transactions). With the block id, a client need only locate the appropriate block, then iterate over only the transactions in said block, instead of the entire history of transactions. Thus, traversing the on-chain dataset comprises looking up each transaction via the transaction id.

Further example features of the chain of dust and how to traverse them are discussed throughout the specification of UK Patent Application No. 2102314.8 filed on 18 Feb. 2021 in the name of nChain Holdings Limited. These chain of dust features include "Change-out and Change-in transactions" which do not carry data and "Rendezvous transactions" which do carry data (as well as data on other event streams). Methods for traversing these types of are also disclosed therein.

Data Indicative of an Event Stored in an Off-Chain Dataset

As discussed above, the transactions in the on-chain dataset comprise data indicative of events in the off-chain dataset. The data indicative of an event in the off-chain dataset is such that it can uniquely identify an event and preferably provides information such that a verification can be made that the data and/or metadata associated with the event have not been changed since its submission to the platform processor 504 or the blockchain. Notably, once the transaction comprising the data indicative of the event has been confirmed on the blockchain, the data is considered immutable by virtue of the blockchain's transaction immutability features.

Preferably, the data indicative of an event in the off-chain dataset is of the form of one of the embodiments as described under the heading "Current State of the Stream" above. As such, the data indicative of the event may be any one or more of the following types. In some embodiments, this may include all possible combinations of one or more of preimage, StreamDigest, H(data) and data:

[streamDigest$_n$]
[streamDigest$_n$][H(data$_n$)]
[streamDigest$_n$][data$_n$]
[preimage$_n$][streamDigest$_n$]
[preimage$_n$][streamDigest$_n$][H(data$_n$)]
[preimage$_n$][streamDigest$_n$][data$_n$]
[preimage$_n$][streamDigest$_n$][split(data$_n$),1 of 2]
[preimage$_n$][streamDigest$_n$][split(data$_n$),2 of 2]

This can also be described in the following manner. Optionally, the data indicative of the event comprises a streamDigest of the event, where the streamDigest is a hash of the preimage of the event. Optionally, the data indicative of the event further comprises the preimage of the event. Optionally, the data indicative of the event further comprises a hash of the data associated with the event. Additionally, or alternatively, the data indicative of the event comprises the event data. Optionally, the event data is split across two or more transactions if the data is too large for a single transaction.

Preferably, the verifier is configured to identify the format the data is stored in and use the appropriate steps to verify the event with the data present. Example steps taken to verify the different data types are described below.

If the data indicative of the event comprises only the streamDigest, this is still enough to uniquely identify the event. In some embodiments, this includes identifying the original data, when it was recorded, and its position in the stream relative to the event that came before and after. To find the event associated with this data indicative of the event, the off-chain dataset is searched to locate the event with the same streamDigest. Preferably, the off-chain dataset stores the streamDigest for each event. Alternatively, the off-chain dataset does not store this information, and the preimage of each event in the event stream is constructed (if not already present) and hashed to determine whether it has same or different streamDigest. The streamDigest can be considered a form of "Proof of Existence" of the event.

As described above, the streamDigest is a hash of the preimage, and the preimage comprises a hash of the data. Locating an event with the same streamDigest also functions as verifying that event data has not changed because, if the data had changed, then the streamDigest would have changed also. Further still, the preimage also comprises the streamDigest of the previous event. Given this chain of hashes, verifying a given transaction and event also verifies that the data of all previous events have not been modified.

As all of the data types comprise at least the streamDigest, these steps can be used for any data type present.

If the datatype comprises the preimage in addition to the streamDigest, then the searching for the off-chain event can be made simpler. The preimage comprises the index of the event in the stream. Therefore, instead of locating the event that has the same streamDigest (a process which may involve constructing the preimage and hashing it to locate the streamDigest for each event in the off-chain dataset), a more time and computationally efficient method is used of iterating over and counting each event until the event at the index provided in the preimage is located (notably, no comparison is necessary, just counting the indexes). If the events are stored in an array and/or an indexed database, then the events do not need to be iterated over and a verifier can jump to that index directly as its position in memory will be directly calculable and/or already known.

The preimage may also comprise further details to verify that the on-chain data validly represents an off-chain event. For example, the whenRecorded member of the preimage is optionally compared with when the event was recorded in the database. The times should be the same or similar enough.

If the datatype comprises a hash of the data or the data itself (whether split across two or more transactions or not), then this will also be verified by the verifier so that the same data is present on-chain as off-chain.

In an alternative embodiment, the present disclosure relates to verifying that a stream of events is faithfully represented on-chain without a reference to the chain of dust mentioned above. In this case, with the use of 'attest' or 'notarise' described above without a preimage, the transaction size and hence the transaction cost (i.e. miner fee) is minimised. Such a minimal transaction would have a single funding input and a single OP_RETURN output. As the transaction size is known in advance, it will possible to pre-arrange UTXO funding values to be available such that no 'change' output is required. Such embodiment may not require synchronisation in the construction of each transaction. If the preimage is not also on-chain, as in some examples of attest and notarise. As the preimage metadata can be obtained from an off-chain source, this can be used for validation of the order of events in this alternative embodiment.

Platform System

According to a further aspect, any one or more of the preceding aspect's methods and systems may be used with a platform processor as described below for providing the on-chain and off-chain data storage as described in the first aspect and/or verification of on-chain and off-chain data storage in the second aspect. This further aspect may be Platform as a Service (PaaS) and Software as a Service (SaaS) offering that advantageously enables rapid delivery of useful real world business and technical applications, such as management of software controlled technical systems or smart contracts, using a blockchain network such as the BSV blockchain.

Figure 10:
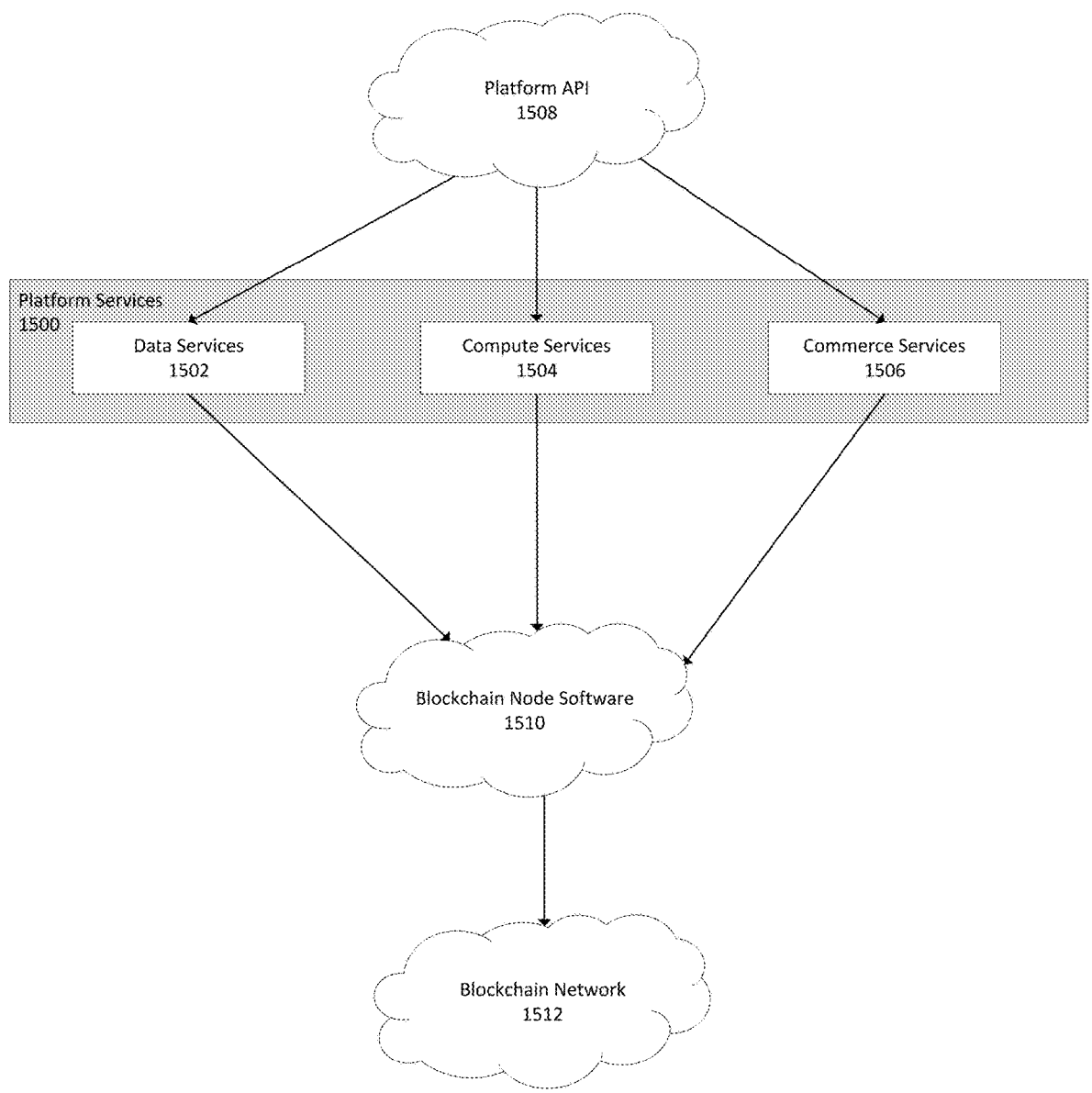
FIG. 10 is a schematic diagram, depicting an overview of a platform for a plurality of services associated with a blockchain, according to an aspect.

An overview of the platform services can be seen in FIG. 10 that shows a high-level schematic of the system. The platform service has a platform processor 1500 that provides an API 1508, via which the services may be accessed by one or more clients.

Platform Services 1500 as shown in this Figure are made up of three families of services and is aimed at allowing users and organisations to easily and securely make use of the advantages offered by the unique properties of a blockchain, without actually implementing any blockchain based software, knowledge, or libraries at the client end. These services are:

Data Services 1502 that aim to simplify the usage of the chain as a commodity data ledger. The Data Services preferably use the data structures and methods provided herein for implementing data writing to and reading from the blockchain.

Compute Services 1504 that aim to provide a generalised compute framework backed by a digital asset such as Bitcoin SV.

Commerce Services 1506 that provide enterprise-class capabilities for transacting using a digital asset such as Bitcoin SV.

Requests may be received via or using the HTTPS protocol from a client at the API, as the API is implemented as a web service. The requested services are then implemented by the one or more service modules or processing resources 1502-1506 using underlying software 1510, such underlying software 1510 being associated with the blockchain, i.e. to implement resources, libraries and/or key-management wallet implementations for creating, processing and submitting transactions associated with the blockchain. Once processed, transactions can be submitted to the blockchain network 1512 (instead of the client implementing any such functionality or transaction libraries). At most, the client may or can implement a digital wallet or the like associated with cryptocurrency or some other digital asset, but this is not essential as the platform service 1500 may also be able to provide and manage the digital asset for the client.

Figure 11:
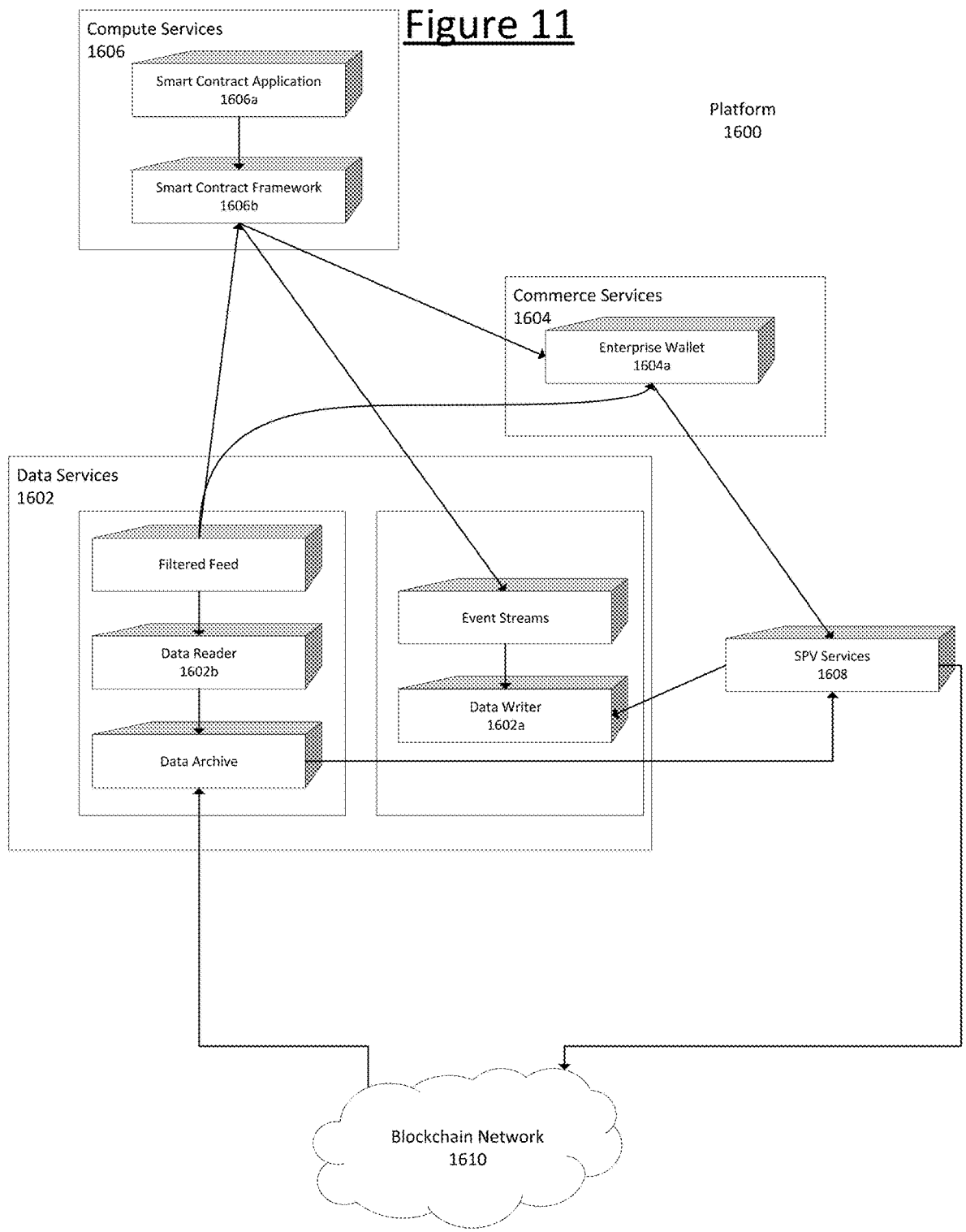
FIG. 11 is a schematic diagram, depicting the components of the platform of a plurality of services that are associated with a blockchain, according to an aspect.

FIG. 11 provides a more granular schematic view of the plurality of services associated with a blockchain, and which can be implemented by the platform 1600 that is associated with an API via which any one or more of the offered services can be accessed. As seen in this FIG. 11, the data services 1602 may include a data writer 1602a and a data reader service 1602b. The event streams and/or data writer optionally implement the method 600 as described in FIG. 6A. Similarly, the client and/or third party wishing to access the data archive (such as in the verification method 900 as described in FIG. 9) may use the data reader 1602b. Further details of event streams are discussed with reference to FIGS. 4 to 8 of UK Patent Application No. 2002285.1 (filed in the name of nChain Holdings Limited on 19 Feb. 2020) and is hereby incorporated by reference. The data writer service 1602a enables clients to write data into the blockchain in a simple, secure and optimised manner. The data reader service 1602b enables the clients to send queries, which returns data that is stored in the blockchain. This may be using filtered streams in which the client may pre-define the type of data that they wish to read from the blockchain on an ad hoc or periodic basis, i.e. within a certain timeframe, or those associated with a set of related or unrelated events or documents that are processed in the blockchain 1610. The data archive feature allows access to logs of previous transaction for a specified event or contract.

The compute services 1606 of the platform 1600 includes an application 1606a and framework 1606b associated with smart contracts, which in some embodiments may be represented as a state machine in the blockchain 1610. The compute services 1606 interacts with the data services 1602 as data will need to be input and results provided to a client for any such computation.

Commerce services 1604 are responsible for provision of enterprise-class capabilities via enterprise wallets 1604a for transacting over the blockchain 1610, based on best-in-class security practices and technologies. For example, in some embodiments, enterprise wallets may implement functionality to enable blockchain transaction processing when more than one person or user or account may need to sign off on a transaction meeting a defined criterion. i.e. associated with cryptocurrency of a large value above a certain predefined limit. An enterprise wallet may also include functionality to implement a threshold number and/or type of signatures to move large amounts of digital assets such as cryptocurrency or tokens representing another resource. The movement of these assets can then be represented on the blockchain following processing based on the criteria applied by such enterprise wallet implementation.

The SPV services 1608 (simplified payment verification) are applications that require information from the blockchain but do not include direct links to it, as they do not run a miner node. Such SPV service 1608 allows a lightweight client to verify that a transaction is included in a blockchain, without downloading the entire blockchain 1610.

Platform Devices

Figure 12:
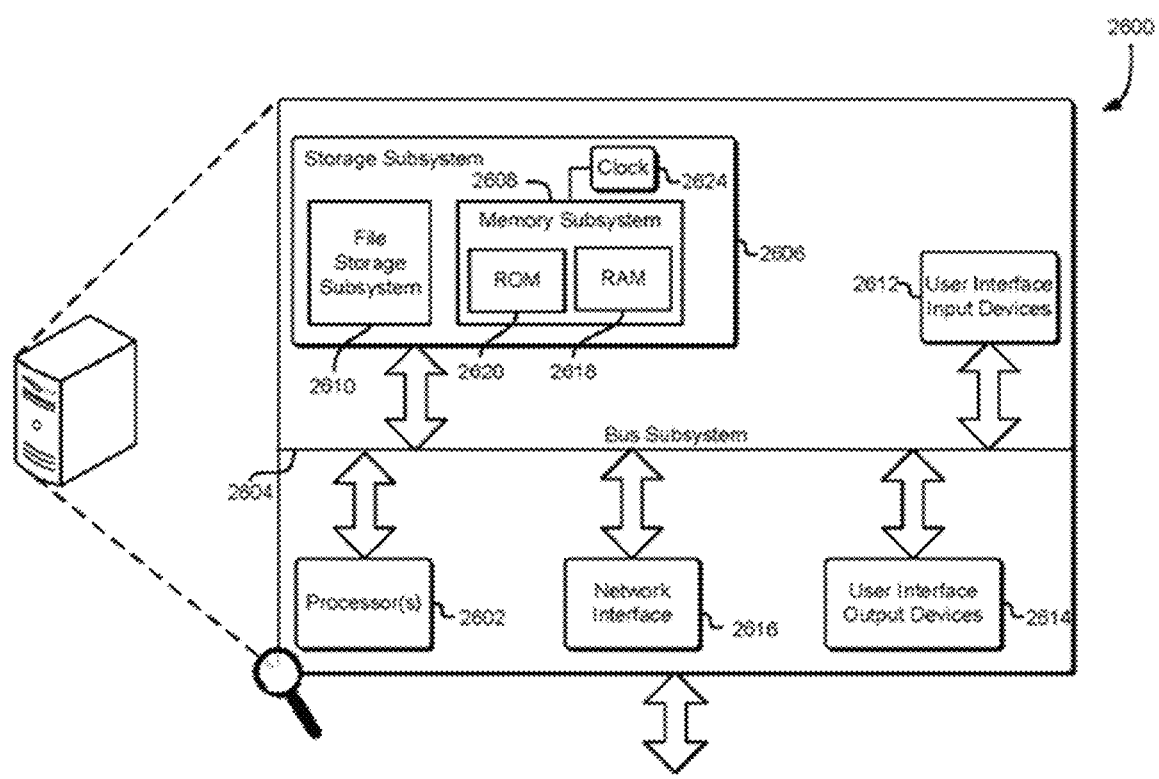
FIG. 12 is a schematic diagram, illustrating a computing environment in which various aspects and embodiments of the present disclosure can be implemented.

Turning now to FIG. 12, there is provided an illustrative, simplified block diagram of a computing device 2600 that may be used to practice at least one embodiment of the present disclosure. In various embodiments, the computing device 2600 may be used to implement any of the systems or methods illustrated and described above. For example, the computing device 2600 may be configured to be used as one or more components in the systems 500, 800 of FIG. 5 or 8, or the computing device 2600 may be configured to be a client entity that is associated with a given user; the client entity making database requests and/or submissions, the platform processor, and/or database manager. Thus, computing device 2600 may be a portable computing device, a personal computer, or any electronic computing device. As shown in FIG. 12, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilise multiple buses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 12 is intended only as a specific example for purposes of illustrating the preferred embodiment of the device. Many other configurations having more or fewer components than the system depicted in FIG. 12 are possible.

Example—Equipment Activity Logs

A high-end equipment manufacturer wishes to have access to important activity logs of its customers' equipment. This may be as part of a warranty or service agreement. By analysing the logs, the manufacturer may be able to take proactive steps to ensure that the equipment is performing at peak efficiency. The manufacturer may configure an individual Event Stream for each product line using the checkpoint method. The equipment will automatically log important events during its lifetime—starting with registration. The manufacturer is able to remotely monitor any activity including heartbeat, runtime hours, change of critical components, use of qualified materials etc.

Using a checkpoint method, a large amount of data can be stored in the off-chain database for access of individual data points of interest and the on-chain dataset is used as a heartbeat monitor so they can check that data is being updated, but are not interested in the data itself.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "determining", "providing", "calculating", "computing," "identifying", "combining", "establishing" "sending", "receiving", "storing", "estimating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention claimed is:

1. A computer implemented method of maintaining a status of a stream on a blockchain comprising the steps:
   receiving a create stream message, the create stream message comprising an indication of at least one trigger condition,
   based on a trigger condition being met, performing the steps of:
      obtaining data indicative of a state of the stream, and
      generating an append transaction comprising the data indicative of the state of the stream.

2. The method of claim 1, the method comprising, after generating the append transaction:
   arranging for the append transaction to be broadcast to the blockchain; and/or
   monitoring re-occurrence of the trigger condition.

3. The method of claim 1, further comprising the step of:
   generating and broadcasting an initial transaction comprising at least data based on the indication of the trigger condition.

4. The method of claim 3, wherein:
   the data based on the indication of the trigger condition is stored on an output of the initial transaction; and/or
   the append transaction comprises an input that spends an output of the initial transaction.

5. The method of claim 1, wherein:
   the append transaction comprises an input that spends an output of an append transaction previously submitted to the blockchain; and/or
   the data indicative of the state of the stream is stored on an output of the append transaction.

6. The method of claim 1, wherein the trigger condition is based on any one or more of:
   reception of a message indicating the stream is finalised,
   an elapsed time,
   a comparison of an elapsed time and a threshold time, and/or
   a comparison of a number of events received and a threshold number of events.

7. The method of claim 6, wherein:
   the elapsed time is based on the time since a preceding trigger condition was met and/or the time since the create message was received, and/or
   the create message further comprises the threshold time.

8. The method of claim 6, wherein:
   the number of events received is based on the number of events received since a preceding trigger condition was met and/or a number of events received since the create message was received; and/or
   the create message comprises the threshold number of events.

9. The method of claim 6, wherein:
   the threshold number of events is 1;
   the threshold number of events is greater than 1;
   the trigger condition is based only on the comparison of the elapsed time and the threshold time; and/or
   the trigger condition is based only on the comparison of the number of events received and the threshold number of events.

10. The method of claim 1, wherein the state of the stream comprises a hash of a preimage of a latest event of the stream and optionally the state of the stream comprises the preimage of the latest event of the stream.

11. The method according to claim 10, wherein the state of the stream comprises data indicative of a data of the latest event of the stream, and optionally wherein the data indicative of the data of the latest event of the stream comprises a hash of the data of the latest event of the stream, and optionally wherein the data indicative of a data of the latest event of the stream is the data of the latest event of the stream.

12. The method of claim 1, wherein the create stream message comprises an indication of a format of the data indicative of a state of the stream.

13. The method of claim 1, further comprising the step of:
   updating an off-chain database with metadata of the append transaction.

14. The method of claim 13, wherein:
   the metadata is used to identify the transaction on the blockchain;
   the metadata is used to verify a presence of the transaction in a block on the blockchain; and/or
   the metadata is used to construct a proof of inclusion of the transaction into the blockchain.

15. The method of claim 13, wherein the metadata comprises any one or more of:
   a transaction id of the append transaction, a subset of the input(s) to the append transaction, a block header of a block the append transaction is included in, a block id of the block the append transaction included in, a timestamp associated with the append transaction, and an array of sibling hashes for the transaction id of the append transaction; and optionally the metadata is used to construct a proof of inclusion of the transaction into the blockchain.

16. The method of claim 1, further comprising the steps of:
   receiving a request to add an event to the stream, the request comprising event data and an override flag,
   generating a further append transaction comprising data indicative the event data, and
   arranging for the append transaction to be broadcast to the blockchain.

17. A device comprising a processor and memory, the memory including executable instructions that, as a result of execution by the processor, cause the device to perform a computer-implemented method of maintaining a status of a stream on a blockchain by:
   receiving a create stream message, the create stream message comprising an indication of at least one trigger condition, and
   based on a trigger condition being met, performing the steps of:
      obtaining data indicative of a state of the stream, and
   generating an append transaction comprising the data indicative of the state of the stream.

18. A system, comprising:
   a platform processor including device comprising a processor and memory, the memory including executable instructions that, as a result of execution by the processor, cause the device to perform a computer-implemented method of maintaining a status of a stream on a blockchain by:

receiving a create stream message, the create stream message comprising an indication of at least one trigger condition, and based on a trigger condition being met, performing the steps of:
- obtaining data indicative of a state of the stream, and
- generating an append transaction comprising the data indicative of the state of the stream; and a client device configured to submit event data to the platform processor.

* * * * *